US008823639B2

(12) United States Patent  (10) Patent No.:  US 8,823,639 B2
Jackson et al.  (45) Date of Patent:  Sep. 2, 2014

(54) ELASTOMERIC INPUT DEVICE

(75) Inventors: Philip Jackson, Glendale, CA (US); Ivan Poupyrev, Pittsburgh, PA (US); Daniel Leithinger, Cambridge, MA (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 605 days.

(21) Appl. No.: 13/117,920

(22) Filed: May 27, 2011

(65) Prior Publication Data

US 2012/0303839 A1  Nov. 29, 2012

(51) Int. Cl.
*G09G 5/00* (2006.01)
*G06F 3/042* (2006.01)
*G06F 3/01* (2006.01)
*G06F 3/041* (2006.01)

(52) U.S. Cl.
CPC ............. *G06F 3/011* (2013.01); *G06F 3/0425* (2013.01); *G06F 2203/04101* (2013.01); *G06F 3/0414* (2013.01)
USPC .......................... 345/156; 345/173; 345/175

(58) Field of Classification Search
CPC . G06F 3/0414; G06F 3/0202; G06F 3/03547; G06F 2203/04109; H01L 2251/5338; H01L 27/3244; H01L 51/0097; G01L 1/246; G01L 5/166
USPC ..................... 345/173–179; 178/18.01–20.04
See application file for complete search history.

(56) References Cited

U.S. PATENT DOCUMENTS

| | | | |
|---|---|---|---|
| 2002/0054030 A1* | 5/2002 | Murphy | 345/173 |
| 2003/0178556 A1* | 9/2003 | Tachi et al. | 250/227.11 |
| 2006/0273304 A1* | 12/2006 | Cok | 257/40 |
| 2007/0040107 A1* | 2/2007 | Mizota et al. | 250/221 |
| 2007/0043508 A1* | 2/2007 | Mizota et al. | 702/19 |
| 2008/0180399 A1* | 7/2008 | Cheng | 345/173 |
| 2010/0097323 A1* | 4/2010 | Edwards et al. | 345/173 |
| 2010/0253650 A1* | 10/2010 | Dietzel et al. | 345/175 |
| 2010/0315381 A1* | 12/2010 | Yi et al. | 345/175 |
| 2011/0205446 A1* | 8/2011 | Hardacker et al. | 348/734 |
| 2012/0256867 A1* | 10/2012 | Annacone | 345/174 |

OTHER PUBLICATIONS

Sato, Toshiki et al., "PhotoelasticTouch: Transparent Rubbery Tangible Interface Using an LCD and Photoelasticity," Oct. 7, 2009, ACM, pp. 43-50, ISBN 978-1-60558-745-5/09/10.*
Bartoli, A. and Zisserman, A., 2004. Direct Estimation of Non-Rigid Registration. In British Machine Vision Conference, 2004. 10 pages.
Bookstein, F.L., Principal warps: Thin-plate splines and the decomposition of deformations. In IEEE Transactions on Pattern Analysis and Machine Intelligence, 11(6):567-585, Jun. 1989.
Cassinelli, A. and Ishikawa, M. 2005. Khronos projector. In ACM SIGGRAPH 2005 Emerging Technologies (Los Angeles, California, Jul. 31-Aug. 4, 2005). D. Cox, Ed. SIGGRAPH '05. ACM, NewYork, NY, 2 pages.

(Continued)

*Primary Examiner* — Alexander Eisen
*Assistant Examiner* — Sanjiv D Patel
(74) *Attorney, Agent, or Firm* — Dorsey & Whitney LLP

(57) ABSTRACT

An input device for tracking three-dimensional movements. The input device includes a tracking structure and is in electronic communication with a computing device. The tracking structure is detectable by a tracking device. The tracking structure is configured so that as the input device is deformed, the tracking structure deforms correspondingly.

32 Claims, 24 Drawing Sheets

(56) References Cited

OTHER PUBLICATIONS

Corso, J. et al., Stereo-Based Direct Surface Tracking with Deformable Parametric Models, 2003., 8 pages.

Hayes, R. et al., Super *Cilia* Skin: An Interactive Membrane, CHI 2003, Apr. 5-10, 2003, 2 pages.

Hilliges, O. et al. "Creating Malleable Interactive Surfaces using Liquid Displacement Sensing", IEEE Tabletop and Interactive Surfaces (now ACM ITS), Amsterdam, the Netherlands, Oct. 2008, 4 pages.

Hook, J., et al. 2009. A reconfigurable ferromagnetic input device. In Proceedings of the 22nd Annual ACM Symposium on User interface Software and Technology (Victoria, BC, Canada, Oct. 4-7, 2009). UIST '09. ACM, New York, NY, 51-54.

Impress—a flexible display, a Project by Silke Hilsing 2009, accessed on the Internet Nov. 29, 2012 http://www.silkehilsing.de/impress/blog/; 16 pages.

Jo, K., et al. "ARForce," The University of Tokyo, 2008, 4 pages.

Johnson, M.K.; Adelson, E.H.; , "Retrographic sensing for the measurement of surface texture and shape," Computer Vision and Pattern Recognition, 2009. CVPR 2009. IEEE Conference on , vol., No., pp. 1070-1077, Jun. 20-25, 2009.

Kakehi, Y., et al. 2008. ForceTile: tabletop tangible interface with vision-based force distribution sensing. In ACM SIGGRAPH 2008 New Tech Demos (Los Angeles, California, Aug. 11-15, 2008). SIGGRAPH '08. ACM, New York, NY, 1-1.

Kamiyama, K., Kawakami, T, "Evaluation of a Vision-based Tactile Sensor", Proc. of 2004 International Conference on Robotics and Automation, Apr. 2004, 6 pages.

Overholt, D.J. "The Emonator: A Novel Musical Interface" Master's Thesis, Massachusetts Institute of Technology, 2000, 71 pages.

Ramey, N. et al. Real Time 3D Surface Tracking and Its Applications. In Proceedings of Workshop on Real-time 3D Sensors and Their Use (at CVPR 2004), 2004, 8 pages.

Reed, M., Prototyping digital clay as an active material. In Proceedings of the 3rd international Conference on Tangible and Embedded interaction (Cambridge, United Kingdom, Feb. 16-18, 2009). TEI '09. ACM, New York, NY, 339-342.

Rosenberg, I. D., et al. 2009. IMPAD: an inexpensive multi-touchpressure acquisition device. In Proceedings of the 27th international Conference Extended Abstracts on Human Factors in Computing Systems (Boston, MA, USA, Apr. 4-9, 2009). CHI '09. ACM, New York, NY, 3217-3222.

Salzmann, M. et al. Closed-Form Solution to Non-Rigid 3D Surface Registration. In European Conference on Computer Vision, 2008, pp. 1-14.

Salzmann, M. et al. Surface Deformation Models for Nonrigid 3D Shape Recovery. In IEEE Transactions on Pattern Analysis and Machine Intelligence, vol. 29, No. 8, Aug. 2007, pp. 1-7.

Sato, T., et al., PhotoelasticTouch: transparent rubbery tangible interface using an LCD and photoelasticity. In Proceedings of the 22nd Annual ACM Symposium on User interface Software and Technology (Victoria, BC, Canada, Oct. 4-7, 2009). UIST '09. ACM, New York, NY, 43-50.

Sheng, J., et al. 2006. An interface for virtual 3D sculpting via physical proxy. In Proceedings of the 4th international Conference on Computer Graphics and interactive Techniques in Australasia and Southeast Asia (Kuala Lumpur, Malaysia, Nov. 29-Dec. 2, 2006). GRAPHITE '06. ACM, New York, NY, 213-220.

Smith, J.D., et al. Low Cost Malleable Surfaces with Multi-Touch Pressure Sensitivity. In Proc. IEEE tabletop '07, 4 pages, (Oct. 12, 2007) (ISBN 978-0-76952013-1).

Smith, R. T., Thomas, B. H., and Piekarski, W., Digital foam interaction techniques for 3D modeling. In Proceedings of the 2008 ACM Symposium on Virtual Reality Software and Technology (Bordeaux, France, Oct. 27-29, 2008). VRST '08. ACM, New York, NY, 61-68.

Vlack, K et al. GelForce: a vision-based traction field computer interface. In CHI '05 Extended Abstracts on Human Factors in Computing Systems (Portland, OR, USA, Apr. 2-7, 2005). CHI '05. ACM, New York, NY, 1154-1155.

Vogt, F., et al. A malleable surface touch interface. In ACM SIGGRAPH 2004 Sketches (Los Angeles, California, Aug. 8-12, 2004). R. Barzel, Ed. SIGGRAPH '04. ACM, New York, NY, 1 page.

\* cited by examiner

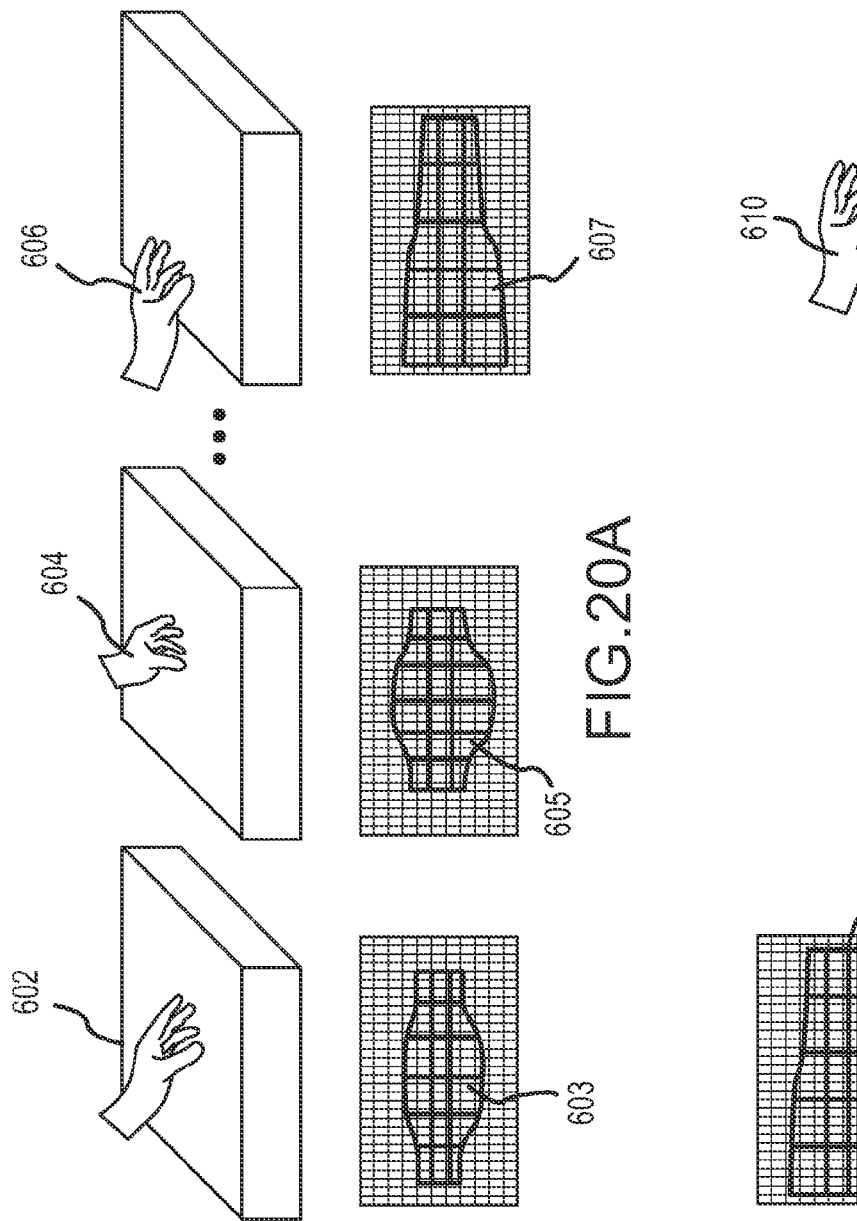

ELASTOMERIC INPUT DEVICE

FIELD

The present invention relates generally to computing devices, and more specifically, to input devices for computing devices.

BACKGROUND

A number of input devices are used for a variety of electronic devices, for example, a mouse for a computer, capacitive touch screen for a mobile computing device, and so on. However, most of these input devices may only be able to control a single point at a time (e.g., a mouse pointer). On the other hand, human hands, fingers, and other appendages may be moved in a variety of different spatial dimensions. Most input devices do not provide for an accurate method for tracking human hand motion, which may be more complex than other input-type movements. For example, some input devices may use finger tracking to attempt to track and record human hand motion, but these may not be very accurate and/or may not provide data for all hand movements and forces. In other input devices, an exoskeleton or glove may be placed on human hand and attempt to record and track finger movements. However, these input devices may often be heavy, intrusive (may completely cover a user's hand), or expensive, as well as may have low precision or tactile fidelity.

SUMMARY

Examples of the disclosure include an input device configured to be in electronic communication with a computing device. The input device may include an elastomeric material and a tracking structure. The tracking structure is configured to be detectable by a sensor (e.g., a camera, or position sensor). The tracking structure is operably connected to the elastomeric material. Thus, as the elastomeric material is deformed (e.g., by a user or otherwise) the tracking structure will deform correspondingly. As the tracking structure is configured to be detectable by a sensor, the deformations of the elastomeric material may be determined, recorded, or tracked.

Other embodiments may include an input system for a computing device. The input system may include an elastomeric input device having an elastomeric body and a tracking structure. The tracking structure is operably associated with the elastomeric body, such that as the elastomeric body is deformed, the tracking structure deforms. The input system may also include a tracking device. The tracking device is configured to sense the tracking structure and produce deformation data corresponding to deformation of the tracking structure.

Still other embodiments include a method for tracking three-dimensional movements. The method may include the deforming an elastomeric input device, where the elastomeric input device includes an elastomeric body and a tracking structure operably connected to the elastomeric body. The tracking structure is configured to deform in a similar manner as the elastomeric body. The method may also include sensing a deformation of the tracking structure as the elastomeric body is deformed.

BRIEF DESCRIPTION OF THE DRAWINGS

FIG. 20A is a block diagram hand articulations and exemplary corresponding deformation patterns of the tracking structure.

FIG. 20B is an bottom plan view of a pattern of a tracking structure responding to a deformation.

FIG. 20C is diagram of an exemplary hand deformation corresponding to the pattern of FIG. 20B.

SPECIFICATION

Overview

Figure 1:
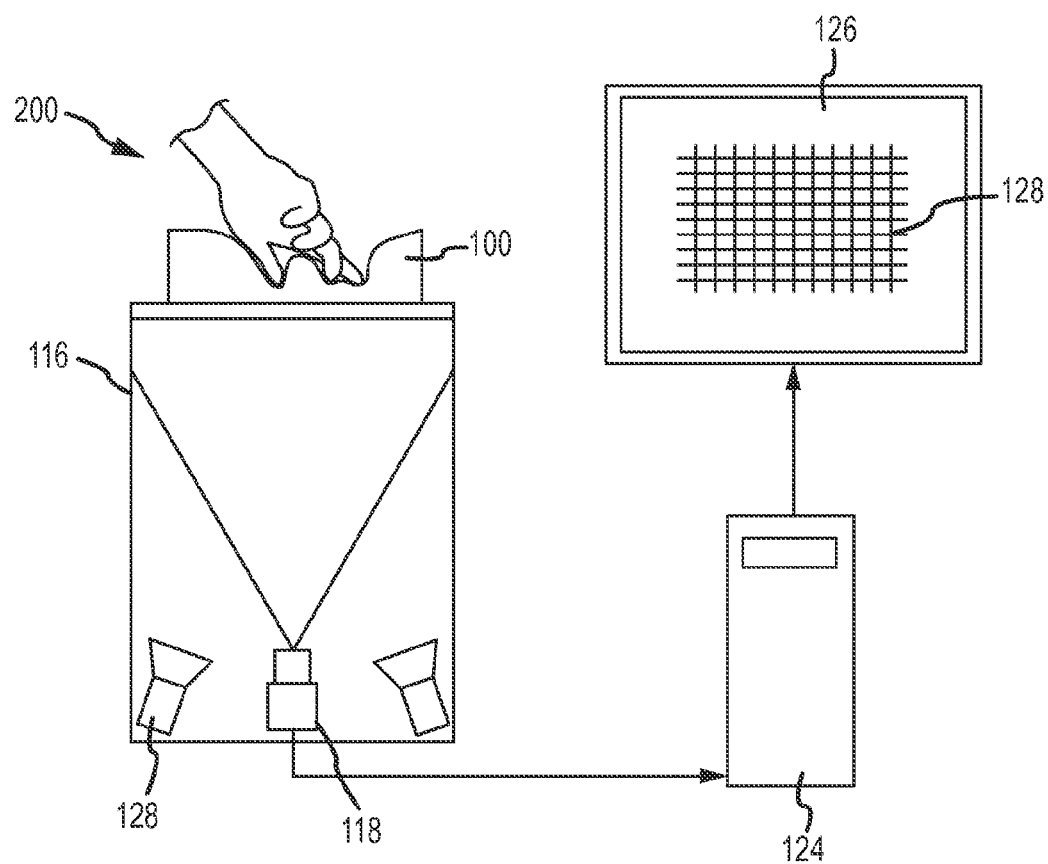
FIG. 1 is a block diagram of a system for tracking three-dimensional movements utilizing an elastomeric input device.

In some embodiments herein, an elastomeric input device is disclosed. The elastomeric input device may be used to track and record human hand motions, and may be used as an input to a computer or other computing device. The elastomeric input device may track complex human hand manipulations, which may be used in a number of applications. For example, the elastomeric input device may provide a data input that may be used to sculpt three-dimensional (3-D) computer models, control robots, vehicles, or medical devices, or may be used to produce and control animation (e.g., computer graphic animated characters). Essentially, the elastomeric input device may be used to provide electronic data corresponding to 3-D movements for many applications, and the 3-D movements may be those of a user, robot, vehicle, or many other objects.

The elastomeric input device may include an elastomeric body, which may be an elastic or flexible material, e.g., silicone. The elastomeric body may be a flexible material that can be deformed by a user. A tracking or reactive structure, may be placed integrally within or be operably connected to the elastomeric material. The tracking structure may be formed of three dimensional objects (e.g., cones or frustums defined in or by the elastomeric body) or may be a series of interconnected points (e.g., a grid or mesh). The tracking structure may be a separate structure in which the elastomeric body may be formed around or may be formed from the elastomeric material itself. For example, the tracking structure may be a mesh in which the elastomeric body is formed around, or the tracking structure may be formed as portions of the elastomeric material. For instance, the tracking structure may be a dyed portion of the elastomeric body, a material that glows when illuminated with an ultra-violet light (UV). Essentially, many types of pattern or structure that may form a set of interconnected lines, points, or geometric shapes may be used in combination with the elastomeric material.

The elastomeric material may then be deformed by a user, computing device (e.g., robot, vehicle), or other object. As the elastomeric material is deformed, the tracking structure within the elastomeric material may also be deformed, with the deformations in the tracking structure corresponding to the deformations of the elastomeric material. The deformations of the tracking structure may be sensed, recorded, captured, or otherwise tracked via a tracking device.

The tracking device may be incorporated into the elastomeric material (e.g., capacitive sensors) and/or may be separated from the elastomeric material (e.g., phototransistors, cameras). The tracking device produces a signal based on the deformations of the tracking structure. The tracking device then may send the signal to computing device so an electronic image, data, or the like may be created based on the deformations of the elastomeric input device.

The tracking or reactive structure may include 3-D structures or other similar interconnected structures, which provide more accurate position and deformation data than unconnected points. The 3-D structures may be interrelated spatially with other 3-D structures within the elastomeric body. The interrelation of the 3-D structures with one another is created by the respective position and orientation in the height, length and width dimension of the input device. The 3-D structures may provide more accurate deformation data as deformations/changes in any direction may be more apparent when tracking interconnected or interrelated points within the tracking structure, as opposed to a structure that includes only a series of points that are independent from one another. For example, at a boundary of a deformation force (e.g., hand manipulation) the information produced from the inter-related tracking structure may better illustrate how the deformation is distributed across a structure or series of lines versus how the force is distributed to a single point. The information from the tracking structure thus may be more precise than the information produced from a single point or series of single points that are deforming.

The elastomeric material including the corresponding tracking structure may be practically any desired shape. For example, the elastomeric material may include a hollow cavity to receive a user's hand, may be geometrical (e.g., sphere, cube, etc.), and so on. Furthermore, the elastomeric material may be configured to be wrapped around any shape, such as a sphere, etc., or may be integrated into a device that may manipulate the elastomeric material.

The elastomeric input device may be used within a system for tracking deformations or 3-D movements of a human or object. The elastomeric input device may be positioned on a support structure that may include a positioning surface which is configured so that a tracking device can track the tracking structure as the elastomeric input device is deformed. The tracking device is then optically (e.g., camera) or electronically (e.g., sensor) connected to the elastomeric input device. Then, as the elastomeric input device is deformed the tracking device senses the changes or deformations in the tracking structure that correspond to the deformations of the elastomeric body. The tracking device then transfers the data corresponding to the deformations to a computing device. The computing device may then use the data in a variety of applications and may display a display grid illustrating the deformations of the elastomeric input device.

Detailed Description

FIG. 1 is a block diagram of an input system 200 utilizing an elastomeric input device 100, the input system 200 is operably connected to a computing device 124. The input system 200 may include the elastomeric input device 100, a support structure 116 for supporting the elastomeric input device 100, a tracking device 118 for tracking the deformations of the elastomeric input device 100, and a light source 127 for illuminating the elastomeric input device 100. The computing device 124 may be operably connected to a display device 126.

The input system 200 is configured to provide data regarding the deformations of the elastomeric input device 100 to the computing device 124. The elastomeric input device 100 may include a tracking structure 104 or reactive structure integrally formed with or operably connected to an elastomeric body 102. The elastomeric body 102 may be a deformable material, and the tracking structure 104 is configured so that as the elastomeric body 102 deforms, the tracking structure 104 will deform correspondingly. The tracking structure 104 is also configured to be detectable or sensed by the tracking device 118, so as it deforms correspondingly with the elastomeric body 102, its deformations may be determined, sensed, or tracked. The tracking device 118 senses deformations to the tracking structure 104 and may then send data corresponding to the deformations to the computing device 124. The computing device 124 may then use the data corresponding to the deformations to display a display grid 128 (in this example, but may be other implementations as described in more detail below) that may reflect deformations corresponding to the elastomeric input device 100.

The computing device 124 may be any computer or device including a processor, e.g., desktop, laptop, smart phone, handheld device, microcomputer, and so on. Additionally, the computing device 124 may be incorporated into other devices such as automobiles, airplanes, industrial or commercial equipment, and so on. The computing device 124 may be configured to receive input from the tracking device 118, and may be configured to process the data and apply the data to a variety of applications and/or objects. The computing device 124 may also be electronically connected to a display device 126, or the display device 126 may be integrated with the computing device 124 (e.g., tablet computer). The display device 126 may then display the inputs, data, or application utilizing the data received from the computing device 124. The display device 126 may be substantially any type of electronic display, e.g., plasma, liquid crystal display, cathode ray tube, or holographic display, etc.

In this example, the article being manipulated on the display device 128 is a display grid 128 similar to the shape of the tracking structure for exemplary purposes. The grid 128 corresponds to the position changes and deformations of the elastomeric input device 100. For example, the tracking device 118 may sense the deformations of the tracking structure 104 and may then transmit electronic signals corresponding to the deformation to the computing device 124. The computing device 124 may transmit the position or deformation signals to the display device 126, and the display device 126 may display the corresponding grid 128. The display grid 128 is also configured to display a deformation based on a predetermined correlation or relationship with the deformation of the elastomeric input device 100. In other words, the display grid 128 deforms in a desired selective defined relationship correlating to the deformation of the elastomeric input device 100. For instance, the correlation may be mathematically defined, such as the amplitude of the deformation on the display device may be a multiple of the amplitude of deformation of the tracking structure of the input device. The correlation may be defined in other ways as well.

The display grid 128 may be any type of electronic display that may track/record deformations in the elastomeric input device 100. For example, the display grid 128 may be incorporated into many other media display forms, such as an image, video, computer graphic (CG) animation, or the like. Additionally, the display grid 128 may be integrated into objects and create, cause or control the movement all or a portion of the objects, such as robot arms, hands, face, characters, etc. on the electronic display. In this example, the display grid may be embodied in a form integral in the object being moved on the display.

The display device may also be a physical object, such as a doll, animal, plant, or other structure that includes the display grid incorporated therein. The motion of all or part of the physical object may be controlled by the deformation of the tracking structure in the input device, as sensed by the tracking device and communicated to the display device. For example, objects formed by ferromagnetic material and controlled by magnetism, such as described in U.S. patent application Ser. No. 12/346,470 entitled "Method and Apparatus for Control of a Flexible Material Using Magnetism," which is hereby incorporated in reference in its entirety, may be suitable display devices formed by physical objects. In this example, the deformation of the tracking structure of the input device is sensed by the tracking device, which then transmits corresponding signals to the display device, which is configured to receive the signals and actuate magnetic controllers and cause the display grid integrated into the physical object to move.

The display grid 128 is meant to represent many types of computerized tracking, recording, and/or analyzing of the movements tracked and recorded by the elastomeric input device 100. The display The display grid 128 is an illustrative display highlighting some of the input types of the elastomeric input device 100 that different applications that may utilize from the elastomeric input device 100, as such the display grid 128 is meant to be exemplary rather than limiting.

Furthermore, as the elastomeric input device 100 may provide input for a variety of different components, the display grid 128 may be modified to suit the requirements of the different components. For example, if the elastomeric input device 100 is used as input to a video game, the display grid 128 may display video game scenes, etc.

With continuing reference to FIG. 1, the tracking structure 104 may be illuminated via the light source(s) 128. The tracking structure 104 may be a grid of members having fluorescent properties that are distributed within the elastomeric body 102. And, as the tracking structure 104 is illuminated by the light source 128, it may in turn illuminate. As the tracking structure 104 is illuminated and subsequently deformed, the tracking device 118 may record or sense the deformation of the tracking structure 104. The tracking device 118 may then transmit electronic signals corresponding to the positions of the tracking structure 104 to the computing device 124 and thus the display grid 128. As the tracking structure 104 moves and deforms, the display grid 128 may also move and deform, correlating to the movements of the tracking structure 104. Thus, a user may be able to move multiple points of the display grid 128 by a single movement interacting with the elastomeric input device 100.

Methods for Capturing Deformations of the Elastomeric Input Device

Figure 2:
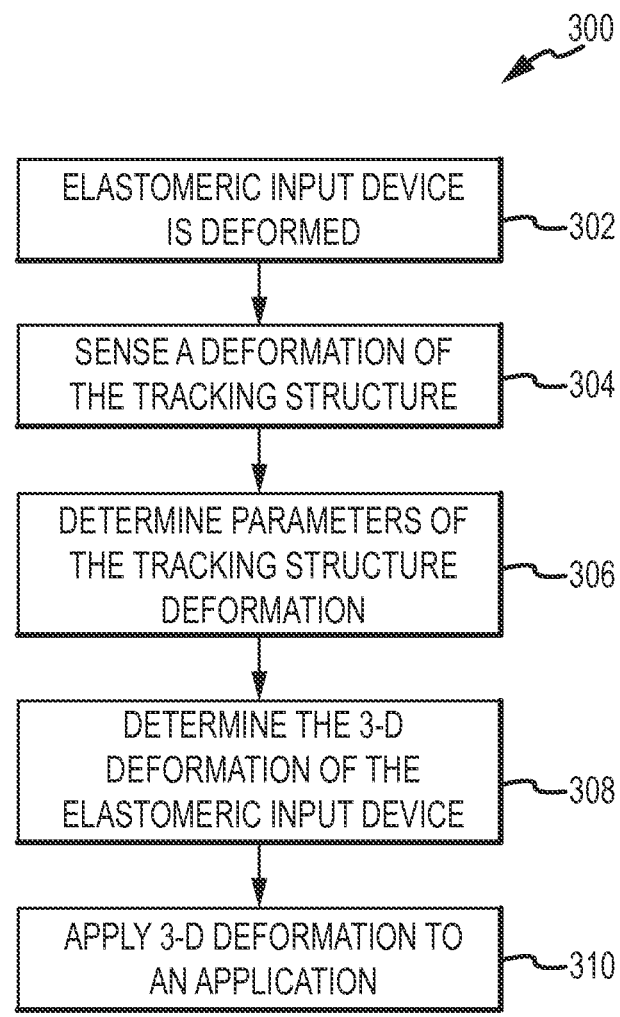
FIG. 2 is a flow chart illustrating a method for tracking three-dimensional movements using the system illustrated in FIG. 1.

FIG. 2 is a flow diagram of one example for using the input system 200 including the elastomeric input device 100 to provide input data. The method 300 includes operation 302, and the elastomeric input device 100 is deformed. The elastomeric input device 100 may be deformed in any manner, and as the device 100 is deformed, the tracking structure 104 may deform as well. Once the elastomeric input device 100 is deformed, the method 300 may proceed to operation 304. In operation 304, the tracking device 118 may sense the change in the tracking structure and may capture an image of the deformed tracking structure 104. For example, the tracking device 118 may be a camera (e.g., a point grey flea camera) and may capture an image or images of the tracking structure 104 as it is deformed. In other examples, the tracking device 118 may be a position sensor and may record data corresponding to a position of the tracking structure 104, rather than an image of the tracking structure 104. In some examples, operations 302 and 304 may be repeated any number of times, for example, a first image (or first position) may be captured and then the elastomeric input device 100 may be deformed again and a second image (or second position) may be captured.

Once an image (or position) of the tracking structure 104 is captured or sensed, the method 300 may proceed to operation 306. In this operation 306, parameters of the tracking structure 104 are determined. If in operation 304, the tracking device 118 is a position sensor, this operation 306 may be omitted. However, in operation 306, parameters such as the length of particular lines within the tracking structure 104 (e.g., if the tracking structure 104 is a grid, the length, size, and spacing of the lines forming the grid), a diameter of the tracking structure 104 (e.g., if the tracking structure 104 includes cones or other circular shapes, the diameter changes of each cone/shape), and so on. The parameters may provide information related to deformation changes in the tracking structure 104, as the structure 104 expands, contracts, depresses downwards or is raised upwards. The parameters may also provide information related to the location and termination of the deformation force. Additionally, in examples where multiple images or positions are recorded, certain specific features of the deformation may be determined, this allows other features (e.g., areas not around the deformations) to be filtered out. Then the computing device 124 may establish correspondences between the first image and the second image (e.g., between a first and second frame of a camera). These correspondences may then be used to drive an interpolation scheme.

After the deformation parameters of the tracking structure 104 are determined, the 3-D deformation of the elastomeric input device 100 may be approximated or estimated in operation 308. The 3-D deformation may be approximated by analyzing the deformation and position changes of the tracking structure 104. Once the three-dimensional deformation is approximated, the method 300 may proceed to operation 310. In this operation 310, the three-dimensional information may be used as an input to an application. For example, the input may be used to model a three-dimensional sculpture, operate a vehicle, control a robot, etc. It should be noted that the elastomeric input device 100 may be used to create a virtual cumulative deformation. For example, the elastomeric input device 100 may be deformed and its deformation displayed on the display grid 128 in a real time display on the display screen 126. Then, the elastomeric input device 100 may return to a baseline or normal position, and the elastomeric input device 100 may then be deformed again in a similar location. The display grid 128 may then increase the deformation display, although the deformation in the elastomeric input device 100 may be substantially the same as the original deformation.

The method 300 illustrated in FIG. 2 determines deformations of the elastomeric input device 100 by analyzing/determining parameters related to the deformation of the tracking structure 104. The method 300 then coverts the deformations into electronic signals that may be used in a variety of electronic applications. However, it should be noted that additional operations may be added to the method 300. Furthermore, the method 300 may be implemented by any number of components, such as additional computing devices, tracking devices, and so on.

The Elastomeric Input Device

Figure 3A:
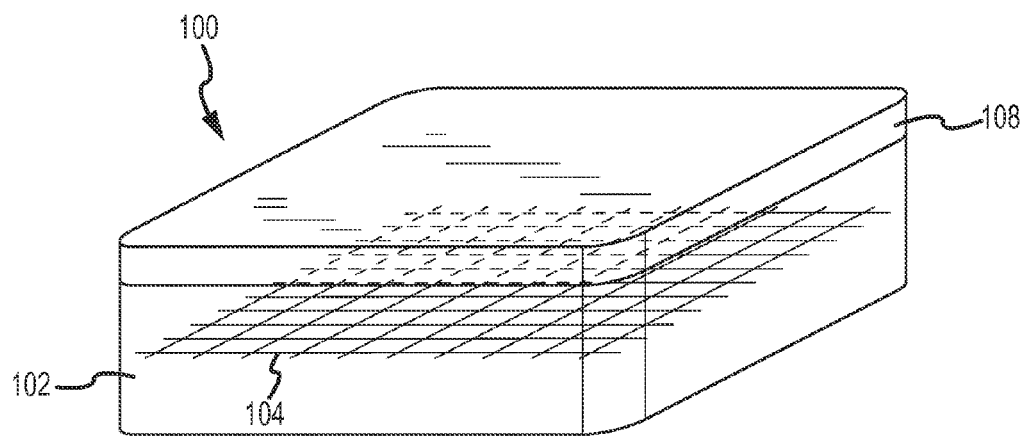
FIG. 3A is an isometric view the elastomeric input device.
Figure 3B:
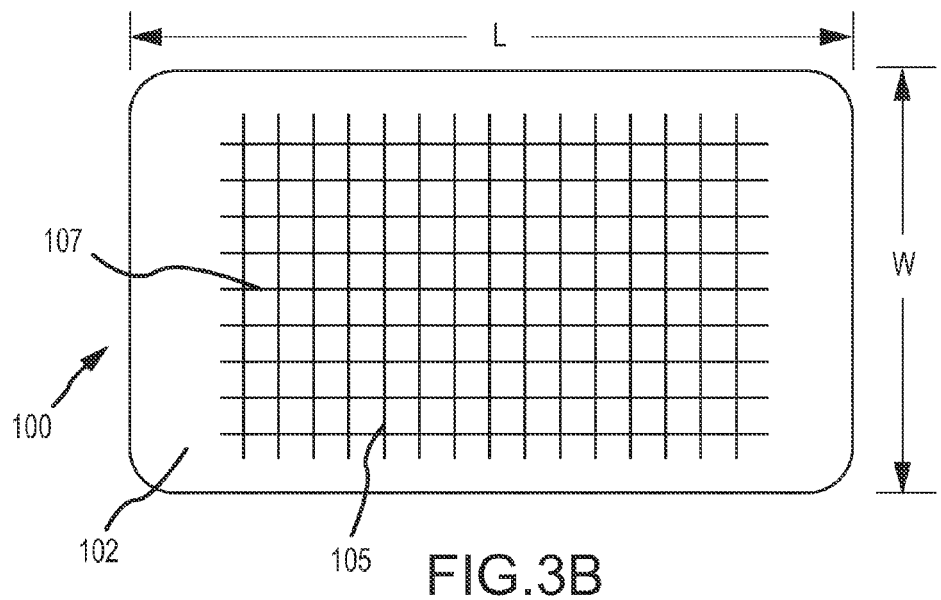
FIG. 3B is a bottom plan view of the elastomeric input device of FIG. 3A.

FIGS. 3A and 3B illustrate various views of the elastomeric input device 100. The elastomeric input device 100 may provide high quality tactile feedback as a user may interact directly with the elastomeric input device 100 to modify or provide input to a computing device. Additionally, the elastomeric input device 100 provides tactile feedback as the user may touch and move the elastomeric input device 100 in substantially (if not exactly) the way he or she wishes to manipulate a computing device, virtual object, or other object. Also, the elastomeric input device 100 may be substantially any size, for example, it may be only a couple of square inches or may be a number of square yards, and the size of the elastomeric input device 100 may depend on the desired input and/or applications to a computing device.

Further, the elastomeric input device 100 may provide data as an input to any number of applications that may utilize 3-D position and deformation data. For example, the elastomeric input device 100 may be used to model an object in 3-D. In this example, a user may physically create and sculpt and object by deforming the elastomeric input device 100. The elastomeric input device 100 may then provide input data to a computing device which may then virtually create and model the same object created physically by the user.

The elastomeric input device 100 may include the elastomeric body 102, the tracking structure 104, and a membrane 108. The tracking structure 104 may be formed as an integral part of the elastomeric body 102 or may be separate from the elastomeric body 102 (e.g., a mechanical structure within the elastomeric body 102), this is described in more detail below. The membrane 108 may be operably connected to a top and/or sides of the elastomeric body 102.

The elastomeric body 102 may be substantially any flexible material, such as silicone, urethane, thermo-plastic elastomeric, vinyl, or an organic biodegradable material. In one example, the elastomeric body 102 is a platinum based silicone or a tin activated silicone. Also, the elastomeric body 102 may be practically any shape, for example, a geometric shape (i.e., rectangular, spherical, or triangular) or a custom shape (i.e., joystick) suitable for its intended use. The elastomeric body 102 may be configured to be resilient in that it may return to a normal position shortly after it is deformed, or the elastomeric body 102 may be configured to be malleable or dynamic in that it may remain in a deformed position for a select period of time. The density of the elastomeric body 102 may be varied depending on the desired deformability, e.g., the less dense the elastomeric body 102 the more intense the deformations that may be formed. Additionally, certain sections of the elastomeric body 102 may have a first density and other sections may have a different density, so that different deformation types and sizes are possible within the same elastomeric input device 100.

The durometer of the elastomeric body 102 may also be varied so that the elastomeric body 102 may be relatively easier or harder to deform by a user. For example, if the elastomeric input device 100 is used by a user with lower hand strength, the durometer may be lower so that the elastomeric body 102 may more easily deform. In another example, the durometer may be decreased so that the elastomeric body 102 may be deformed more dramatically (i.e., larger deformations) or the durometer may be increased so that the deformations can be progressive on top of one another. Further, the durometer of the elastomeric body 102 may be varied depending on the configuration of the tracking structure 104. When the tracking structure 104 is a grid, as shown in FIG. 3A, the elastomeric body 102 may have a durometer of approximately 00 or 000. However, if the tracking structure 104 is a 3-D object or structure (see e.g., FIG. 6A), the durometer may be approximately 10 Shore A, this is discussed in more detail below with respect to FIG. 6A.

The membrane 108 may form a top surface of the elastomeric input device 100. The membrane 108 may provide a surface for which a user, robot, or other object may interact with. For example, the membrane 108 may be a rubber material, platinum cured silicon, or other material that may protect the elastomeric body 102 and provide a flexible and sturdy interaction surface for user. Additionally, the membrane 108 provides a protective surface for the user. For example, in some instances the elastomeric body 102 may transmit a residue to a user's fingers or may otherwise have a tacky feel and the membrane protects the user from substantially contacting the elastomeric body 102.

The membrane 108 may also include a reflective material on its bottom surface so that light reflecting within the elastomeric body 102 may be re-reflected into the elastomeric body 102 by the membrane 108. This is beneficial as the internal reflections may increase the resolution of the tracking structure 104 to the tracking device 118.

The tracking structure 104 is used to detect, track, record, or otherwise determine deformations in the elastomeric body 102. The tracking structure 104 may be detectable, readable, or trackable by a sensor, camera, optical device, or the like. As shown in FIGS. 3A and 3B, the tracking structure 104 is operably connected to the elastomeric body 102, such that as the elastomeric body 102 deforms the tracking structure 104 may deform as well. Additionally, the tracking structure 104 may deform correspondingly with the elastomeric body 102, e.g., the tracking structure 104 may deform exactly as the elastomeric body 102 deforms, or may deform by a relationship (e.g., percentage or in a mathematically determinate way) related to the deformation of the elastomeric body 102. For example, the elastomeric body 102 may deflect approximately 0.5 inches in response to a force, and tracking structure 104 may deflect approximately 0.4 inches in response to the same force. This example still allows for relative accurate tracking of deformations to the elastomeric body 102 because the relationship between the deformation of the elastomeric body 102 and the tracking structure 104 may be defined. However, other examples, the tracking structure 104 may be configured to deform in substantially the same manner as the elastomeric body 102.

The tracking structure 104 may be substantially any type of interrelated structure, such as a grid, triangle mesh, honeycomb mesh structure, cone, frustum, pyramid, and so on. The type of the tracking structure 104 may determine how the tracking structure 104 is interrelated. If the tracking structure 104 is a grid of intersecting members, the interrelationship may be defined by the physical connection between each member at and extending after each intersection. In this example, the tracking structure 104 may be further defined as being interconnected, as the members intersect one another. If, on the other hand, the tracking structure 104 is one or more 3-D structures, the tracking structure 104 is interrelated due to the orientation of each object within the elastomeric body 102 (e.g., the orientation along a height, length, and depth).

The tracking structure 104 is integrated with or operably connected to the elastomeric body 102. For example, the tracking structure 104 of FIGS. 3A and 3B may be a fluorescent material (such as dye) that may be incorporated or dispersed into the elastomeric body 102 in a grid layout. The tracking structure 104 may also be formed of a separate material that the elastomeric body 102 may be molded around. For example, the tracking structure 104 may first be formed of a first material via a molding process. The formed tracking structure 104 may then be placed within a mold to form the elastomeric body 102, and the material for the elastomeric body 102 is injected around the tracking structure 104 and allowed to form or harden.

As shown in FIGS. 3A and 3B, the tracking structure 104 in the grid layout is a collection of two sets of parallel lines or members orientated orthogonally to one another and lying in a single plane. The grid extends across a width W and a length L of the elastomeric body 102. The lines 105 intersect the lines 107, and as shown in FIG. 3B, the each line 105 may intersect each line 107 once, such that all of the lines 105, 107 intersect one another. Thus, the combination of the lines 105 and the lines 107 form a grid that runs substantially along the length L and the width W the elastomeric body 102. Additionally, the grid may be formed at varying heights within the elastomeric body 102 (see, e.g., FIG. 11) and in this example shown in FIG. 3A, the grid is formed at approximately mid way of the height of the elastomeric body 102.

The grid of the lines 105, 107 allows for deformations in the elastomeric body 102 to be accurately determined. Because the lines 105 and the lines 107 are integrated with the elastomeric body 102, they each deform in a manner corresponding to the elastomeric body 102. Additionally, due to the fact that the lines 105 and the lines 107 are interconnected (since they intersect one another), the full contour of the deformations may be more accurately sensed by the tracking device 118. This is because as the elastomeric body 102 deforms, the deformation may have a maximum point of deformation and a minimum point of deformation (or zero deformation). Because the tracking structure 104 is formed by the intersecting lines 105, 107 forming the grid, the deformations of the intersecting or interrelated lines 105, 107 more completely represents the full shape and subtle changes of the deformation, especially along the transitions between a maximum and minimum deflection. In contrast, if the tracking structure 104 were to consist of independent points dispersed throughout the elastomeric body 102, it may be possible for the tracking device 118 to sense the maximum and minimum points of deflection of the elastomeric body 102; however, the tracking sensor 118 would not be able to precisely sense the areas of transition between the maximum and minimum points.

The tracking structure 104 above is configured as a single plane of intersecting lines 105 and lines 107 as in two-dimensions. In other examples, the lines 105, 107 may include a depth that may correspond to a height of the elastomeric body 102 (or a portion of the height). In this example, the lines 105, 107 may form a 3-D grid that includes interrelated structure along each axis of the elastomeric body, e.g., width, length, and height. For example, it may be a grid coextensive and spaced apart from a second grid (see, e.g., FIGS. 14A-14C), with tracking structure portions (lines) extending between the points of intersection of each grid. In another example, the tracking structure 104 may be a honeycomb pattern formed of flexible materials around which the elastomeric body 102 may be formed.

Exemplary Input System Utilizing the Elastomeric Input Device

Figure 4A:
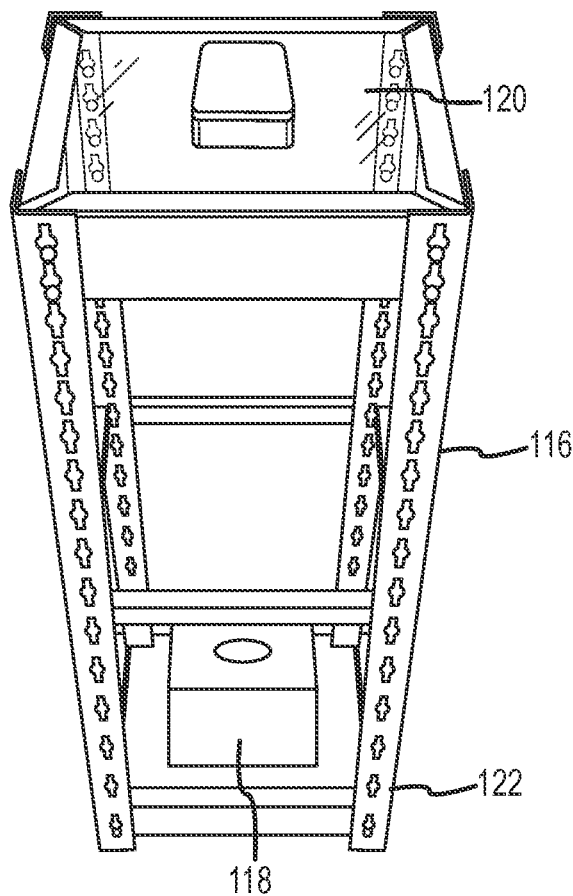
FIG. 4A is an isometric view of an input system to be used with the system of FIG. 1.
Figure 4B:
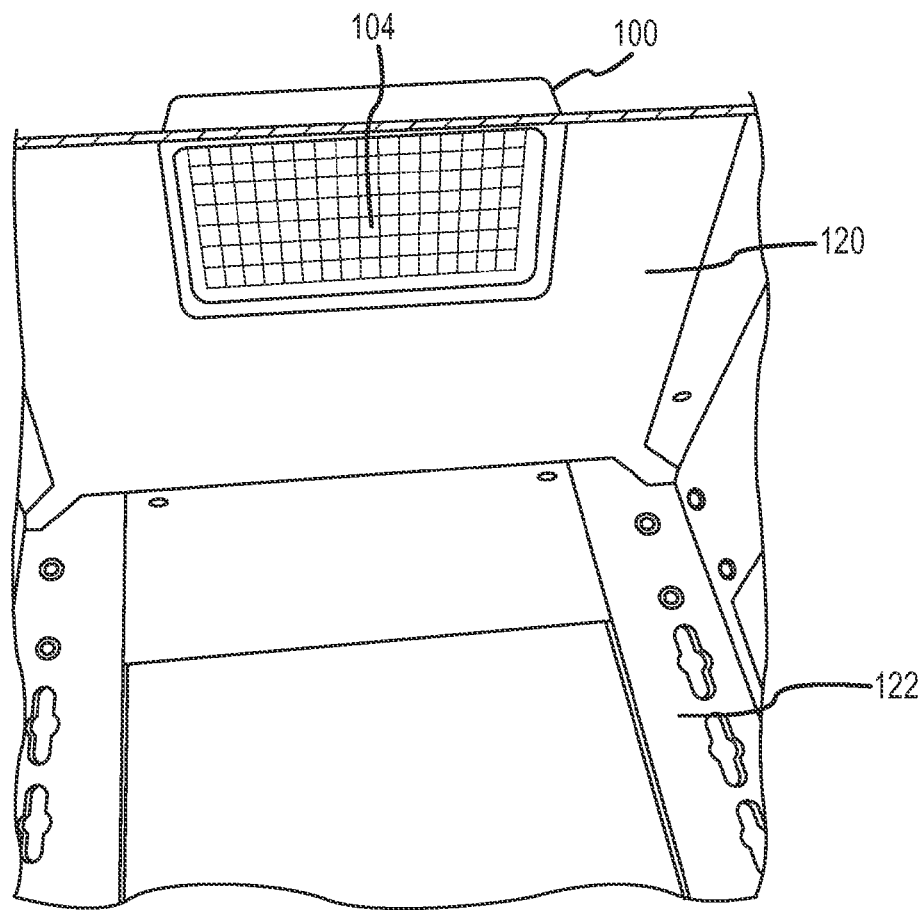
FIG. 4B is an enlarged bottom isometric view of the input system of FIG. 4A.

FIG. 4A is an isometric view of the input system 200, which may include the elastomeric input device 100 positioned on the support structure 116 over the tracking device 118. FIG. 4B is a bottom isometric view of the support structure 116 and the elastomeric input device 100. In this example, the tracking structure 104 may include members having fluorescent properties dispersed in intersecting lines 105, 107 forming a planar grid through the elastomeric body 102 as described above. For example, the elastomeric body 102 may be dyed with a fluorescent material in a grid to form lines 105, 107, or a grid structure formed of fluorescent material may be molded into the elastomeric body 102.

The elastomeric input device 100 may be positioned on the support structure 116 over the tracking device 118. The support structure 116 may include a frame 122 and a positioning surface 120. Because the tracking structure 104 as shown in FIG. 4A may be visible (after absorbing ultra-violet light), the positioning surface 120 may be glass, or other substantially clear materials, e.g., clear plastic. Thus, as shown best in FIG. 4B, the tracking structure 104 is visible through the positioning surface 120. The positioning surface 120 is clear to allow the tracking device 118 to capture the movements and deformations of the tracking structure 104 through the positioning surface 120.

The tracking device 118 tracks the deformations and movements of the tracking structure 104. For example, the tracking device 118 may be an optical sensor, camera, capacitive sensor, or the any other sensing device. In some examples, the tracking device 118 may be a high-resolution array of two-dimensional optical sensing elements (e.g., phototransistors). These examples may allow the positioning surface 120 to be substantially flat and allow the elastomeric input device 100 to be placed on top of the positioning surface 120. However, in the example illustrated in FIGS. 1 and 4A, the tracking device 118 may be a single camera. The tracking device 118 may be operably connected to the computing device 124, e.g., via WiFi, Bluetooth, Ethernet, system bus, or the like. In still other examples, the tracking device 118 may be an image scanner, such as a laser scanner, charged-coupled device, or a contact image sensor, or the like. In these examples, the tracking device 118 may scan the surface, which may increase the data collected from the tracking structure 104 when the tracking structure 104 is a three-dimensional form or is curved.

The tracking device 118 may be underneath the positioning surface 120 in order to more accurately sense the tracking structure 104. For example, referring to FIGS. 1, 4A, and 4B, the tracking device 118 may be positioned underneath the positioning surface 120 and be substantially aligned with a mid point of the elastomeric input device 100. The tracking device 118 may be able to sense or track substantially all of the deformations or movement of the elastomeric input device 100. The tracking device 118 may be positioned in other locations than directly below the support structure 116, with the tracking device 118 calibrated for its positional relationship relative to the tracking structure 104.

The input system 200 may also include a light source 127 positioned underneath the position surface 120. The light source 120 in this example is an ultra violet light (e.g., Philips TL-D 15W BLB T8 1SL peaking at about 370 nm), in order to cause the tracking structure 104 to emit illumination for more effective and robust sensing. However, depending on the type of tracking structure 104 used, the light source 127 may be varied. Other light sources 128 may be used, for instance, incandescent or infrared. Additionally, filters (e.g., colored filters) may also be placed on the light source 120 in order to create a desired illumination of the tracking structure 104.

In the example illustrated in FIGS. 1, 4A, and 4B, the tracking structure 104 may be sensed by the tracking device 118, for example, as the fluorescent grid absorbs the ultra-violet light it may emit visible light spectrums. In examples utilizing an ultra-violet light source 127, the input system 200 may better prevent shadows and other unwanted visible light artifacts (e.g., ambient lighting) from inhibiting more accurate tracking of the tracking structure 104. For example, the tracking device 118 and/or computing device 124 may include a filter that may be configured to filter out non-ultra-violet light ranges.

In other examples, the tracking structure 104 may be tracked using a position sensor or the like, for instance, the tracking structure 104 may be configured to emit a form of signal other than a light signal (e.g., luminescence). For example, the tracking structure 104 may be a series of capacitive sensors which may emit a capacitive signal in response to deformations. In these examples, the positioning surfacing 120 may be substantially any type of material. In another example, the tracking structure 104 may be a physical object that may change properties based on movement, touch, or deformation. In this example, the tracking structure 104 may be a set of conductive spheres and the changes or deformations to the tracking structure 104 may be tracked by changes in capacitance or resistance. In another example, the tracking structure 104 may include magnetic properties which may be tracked by the tracking device 118.

Furthermore, the input system 200 illustrated in FIG. 4A is simply an exemplary system for utilizing the elastomeric input device 100, and other systems utilizing a tracking device 118 with the elastomeric input device 100 are possible, e.g., the elastomeric input device 100 may be integrated into a dashboard of a vehicle with associated tracking devices 118 positioned behind the elastomeric input device 100.

The tracking device 118 captures deformations of the elastomeric input device 100 by sensing deformations in the tracking structure 104. As discussed above, the tracking structure 104 deforms in a corresponding manner to deformations in the elastomeric body 102. Once the tracking device 118 senses or captures the deformations it may transmit signals corresponding to the deformations to the computing device 124.

Figure 5A:
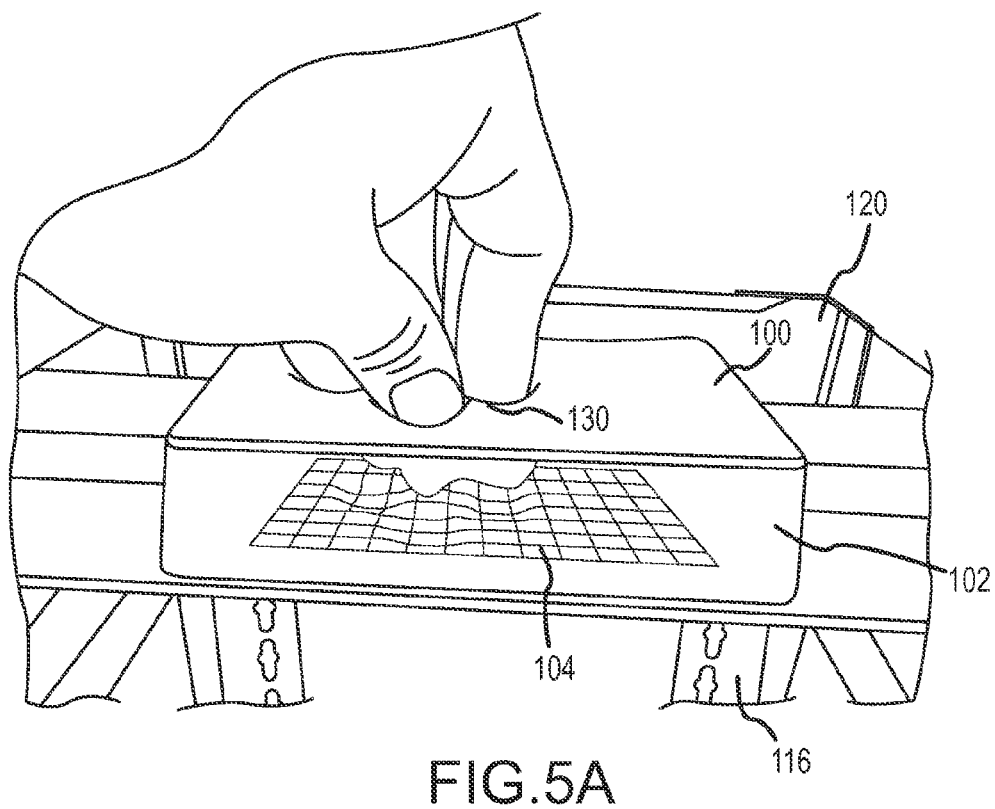
FIG. 5A is an isometric view of the elastomeric input device of FIG. 3A deformed creating a depression in an elastomeric body and a tracking structure.
Figure 5B:
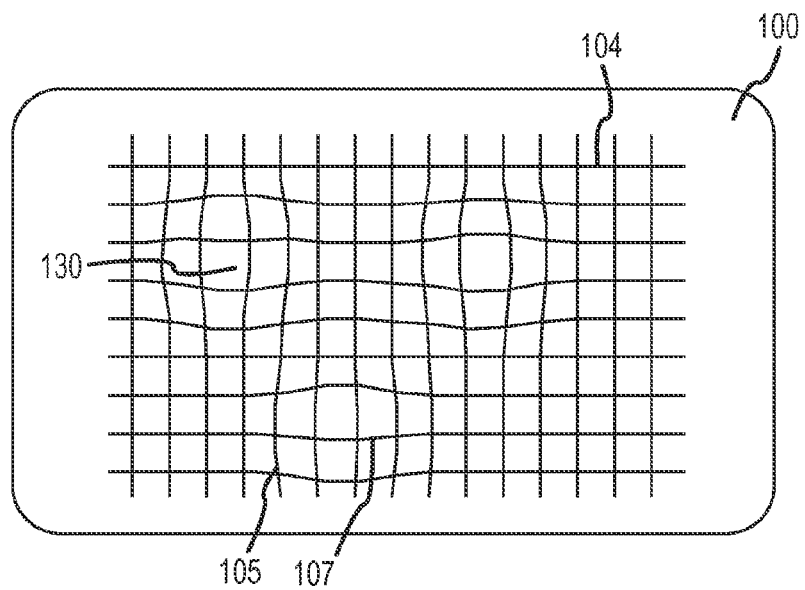
FIG. 5B is a bottom plan view of the elastomeric input device of FIG. 5A illustrating the tracking structure deformation corresponding to the elastomeric body deformation.

FIG. 5A is a top isometric view of the elastomeric input device 100 in a deformed position and FIG. 5B is a bottom plan view of the elastomeric device 100 in the deformed position illustrated in FIG. 5A. The elastomeric device 100 may be deformed by a user manipulating the elastomeric body 102 and tracking structure 104 with his or her fingers/hands. Also, the elastomeric input device 100 may be manipulated by other parts of the user besides his or her hands of fingers. For example, the user may use his or her arms, legs, head or torso to manipulated the elastomeric input device 100. In other examples, the elastomeric device 100 may be deformed by a robot, computing device or other object. In still other examples, the elastomeric input device 100 may form a portion of the robot or computing device, e.g., the elastomeric input device 100 may be a portion of the robot's fingers. In these examples, the elastomeric input device 100 may track how the robot is touching an object.

As the elastomeric device 100 is deformed creating deformation 130, the tracking structure 104 is also deformed. The tracking structure 104 expands around the deformation 130, thus indicating that the elastomeric body 102 is experiencing a forced in the downwards direction. As can be seen in FIG. 5B, the spacing between the lines 105 and the lines may be increased at the deformation, and the size of the spacing may transition towards the baseline (or un-deformed) spacing between the lines 105, 107 farther away from the deformation 130. Additionally, near the boundaries between the deformation 130 and the non-deformed portions of the body 102, the lines 105, 107 may appear to curve as the tracking structure 104 experiences the force deforming the elastomeric body 102. Near the boundaries of the deformation 130, the lines 105, 107 transition from being slightly altered (in position and appearance) to being not altered, e.g., remaining in the normal or baseline position.

The lines 105, 107 may be spaced farthest apart from one another at the maximum depression of the deformation 130. Additionally, at the transition between a maximum depression and a minimal depression, the lines 105, 107 may appear angled with respect to a planar surface (e.g., the position surface 120). This angular appearance may be similar to a topographic map in indicating a change of heights, this is because the lines 105, 107 may be angled as the deformation 130 is transitioning from a maximum deformation to a minimum deformation. Similarly, if for example, the elastomeric input device 100 is pulled upwards (e.g., by pinching the elastomeric body 102), the lines 105, 107 may appear closer to another near a top of the deformation, and may be positioned farther away from one another until returning to a normal or baseline spacing as the lines 105, 107 move down away from a maximum of the deformation.

The deformation 130 is then sensed, tracked, or recorded by the tracking device 118 and transmitted to the computing device 124. For example, if the tracking device 118 is a camera it may record the various positions of the lines 105, 107 throughout the deformation of the elastomeric input device 100. The tracking device 118 may track a single instance of deformation (e.g., one frame if the tracking device 118 is a camera) or may sense multiple instances (e.g., multiple frames if the tracking device 118 is a camera). The frequency of collecting the deformation data, and how it is interpreted and used to control the object on the display 126 may be selected by the user for the particular purpose, this is discussed in more detail below, with respect to FIGS. 18A-20C. The deformation 130 may be easily sensed, as the tracking structure 104 is emitting light due to the fluorescent material interacting with the light source 127.

Figure 5C:
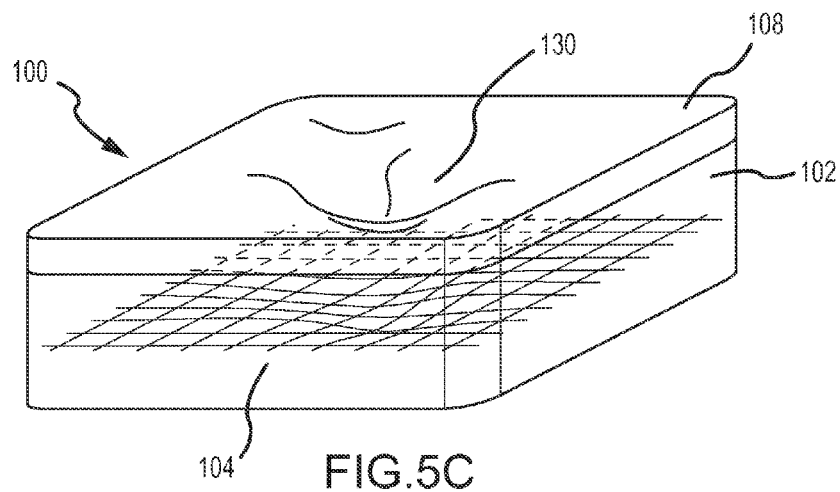
FIG. 5C is a top plan view of the elastomeric input device illustrated in FIG. 3A having a deformation.
Figure 5D:
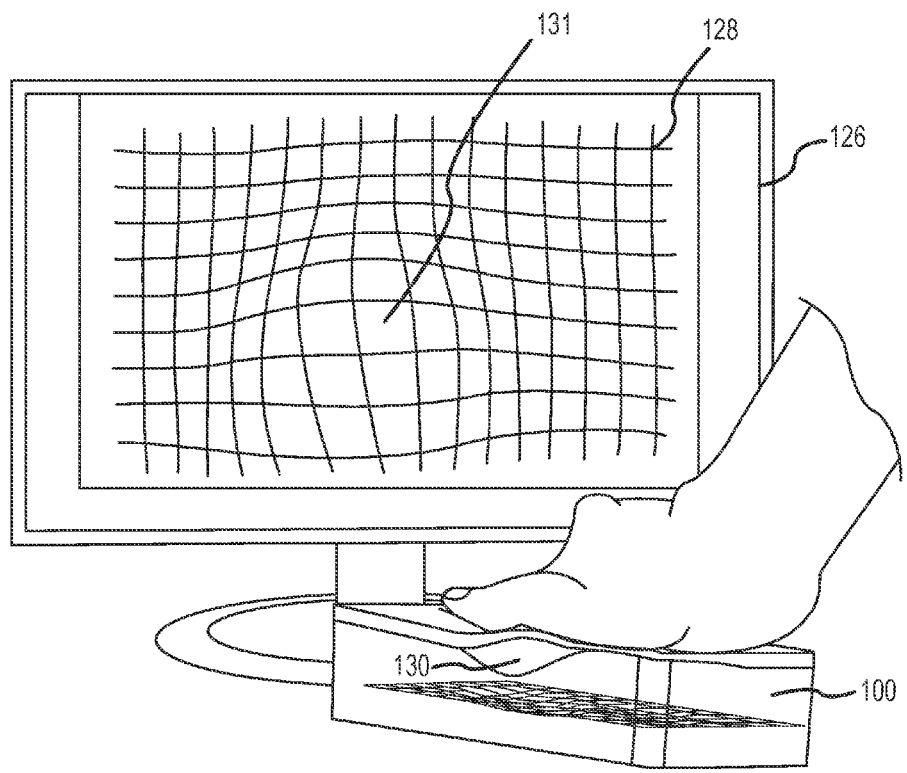
FIG. 5D is a front elevation view of a display grid displaying a deformation corresponding to the deformation of the elastomeric input device illustrated in FIG. 5C.
Figure 5E:
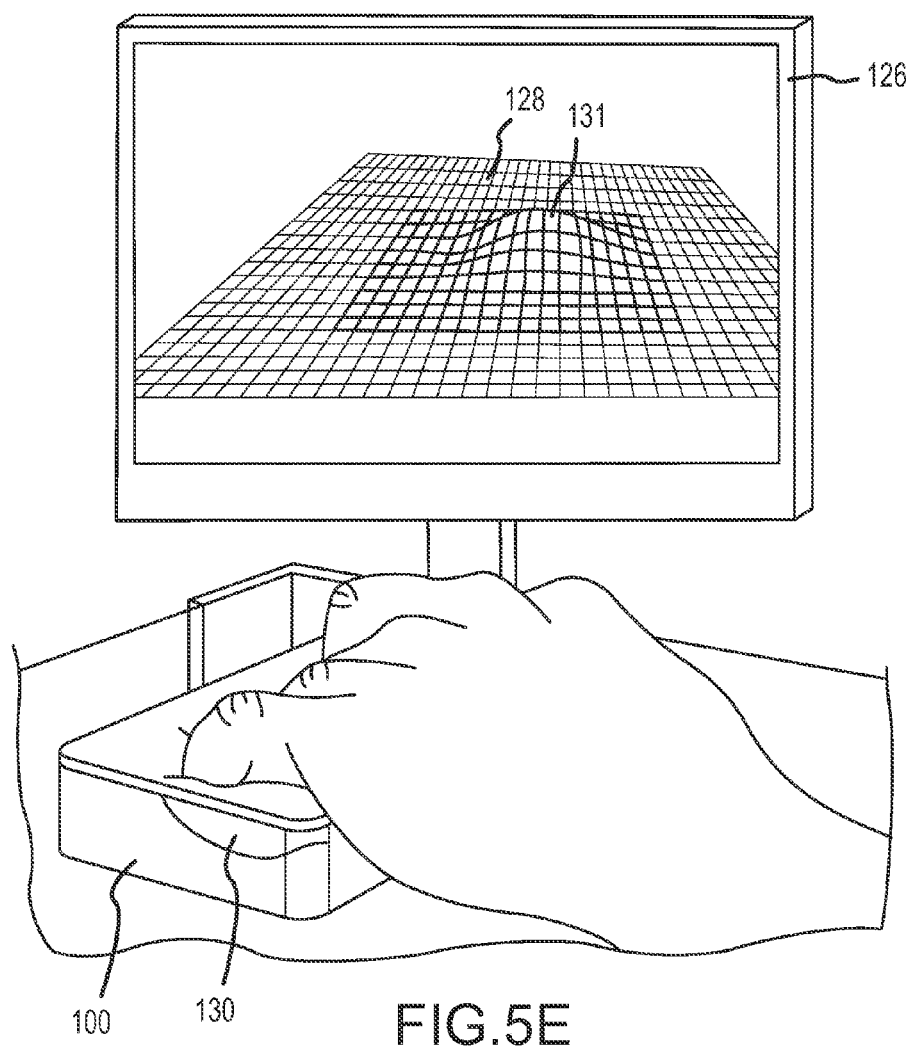
FIG. 5E is an isometric view of the elastomeric input device 100 deforming and the display grid displaying a corresponding deformation on a display device.

FIGS. 5C-5E illustrate an example of the display grid 128 represented on the display device 126 in response to a deformation 130 on the elastomeric input device 100. As the elastomeric input device 100 is deformed, the display grid 128 may deform correspondingly. The elastomeric input device 100 may be deformed in practically any direction, and any deformation of the elastomeric input device 100 may be relatedly reflected on the display grid 128. For example, if the elastomeric input device 100 is stretched, pulled, compressed, etc., the display grid 128 will reflect a similar deformation; however, the deformation in the display grid 128 may be in an opposite or alternative direction, as defined in the interpretation by the computing device 124 of the signals representing the deformation, but the magnitude and size of the deformation may correspond to the deformation in the tracking structure 104. For example, the display grid 128 may be configured to display in the same direction or in an opposite direction of the deformation 130 of the elastomeric input device 100. In other words, the same deformation of the elastomeric input device 100 may be used to sculpt 3-D virtual canyons or mountains on the display grid 128. For example, as shown in FIG. 5E, the deformation 130 downwards with respect to the elastomeric input device 100 may be illustrated as creating an upward deformation, or a ridge, with respect to the display grid 128.

Furthermore, the display grid 128 may deform in a cumulative or a singular manner, e.g., each deformation 130 in the elastomeric input device 100 may be in addition to a deformation 131 illustrated on the display grid 128, or each deformation 130 of the elastomeric input device 100 may be individually displayed on the display grid 128. For example, the deformation 131 may illustrate a single deformation of the elastomeric input device 100, or may be the result of multiple different deformations added or otherwise accumulated together. In a cumulative example, the elastomeric input device 100 may be used to create deformations that may have a larger height, depth or with than the elastomeric input device 100. Interpretations of deformations can be defined by a user as desired, and may include scaling factors or arithmetic manipulation. The display grid 128 may be configured to display deformations relating to the deformations of the elastomeric input device 100 in substantially any predetermined manner or defined relationship.

Alternative Examples for the Elastomeric Input Device

Figure 6A:
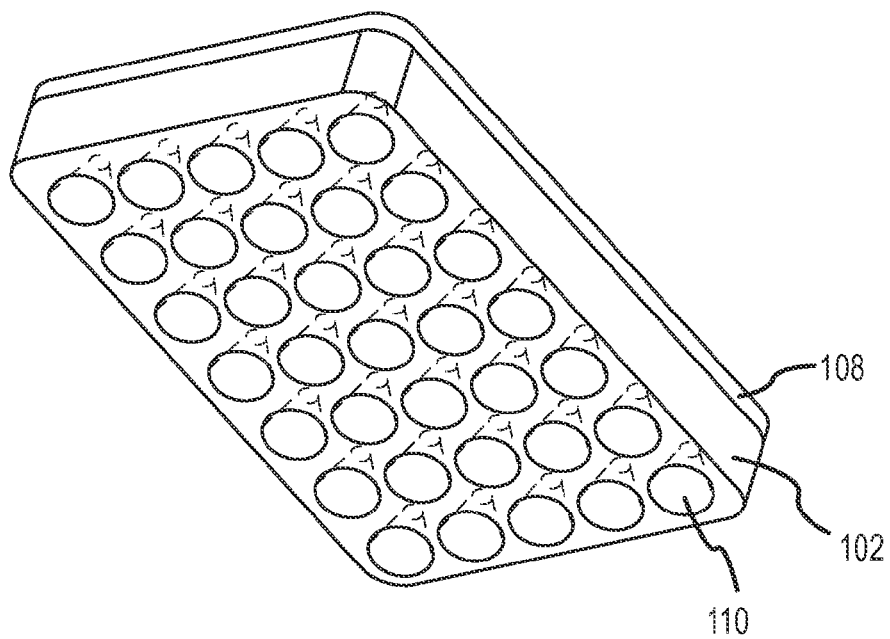
FIG. 6A is an isometric plan view of the elastomeric input device having a cone-shaped tracking structure.
Figure 6B:
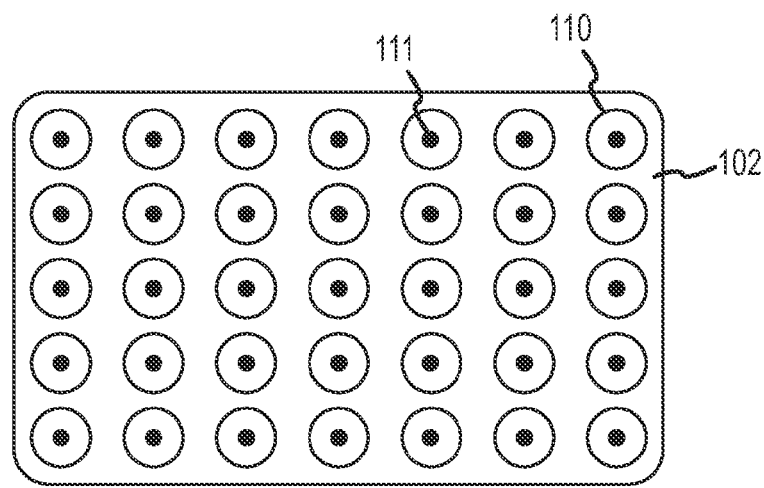
FIG. 6B is a bottom plan view of the elastomeric input device illustrated in FIG. 6A.

FIGS. 6A and 6B illustrate the tracking structure 104 having a series of cones 110 or frustums. The cones 110 may be conical apertures or cavities dispersed throughout the elastomeric body 102. For example, the cones 110 may be formed within the elastomeric body 102 by a negative molding process or other similar process. However, in other examples, the cones 110 may be substantially solid three dimensional shapes formed within the elastomeric body 102, e.g., opaque or clear features in the elastomeric body 102. In some examples, the cones 110 may be configured so that a bottom or largest diameter portion of each cone 110 may be formed on a bottom surface 112 or plane of the elastomeric body 102. The cones 110 may also include a tip 111 at a top surface of each cone, all in the same plane with the elastomeric body 102. The cones 110 may be include a top or apex defined by a series of angled intersection lines (e.g., a point) or the cones 110 may have a top that is frustum-shaped (e.g., having some width/length dimension). There may be a series of cones 110 intermittently spaced in a grid through the elastomeric body 102, or the cones 110 may be spaced regularly in a different pattern.

Figure 7A:
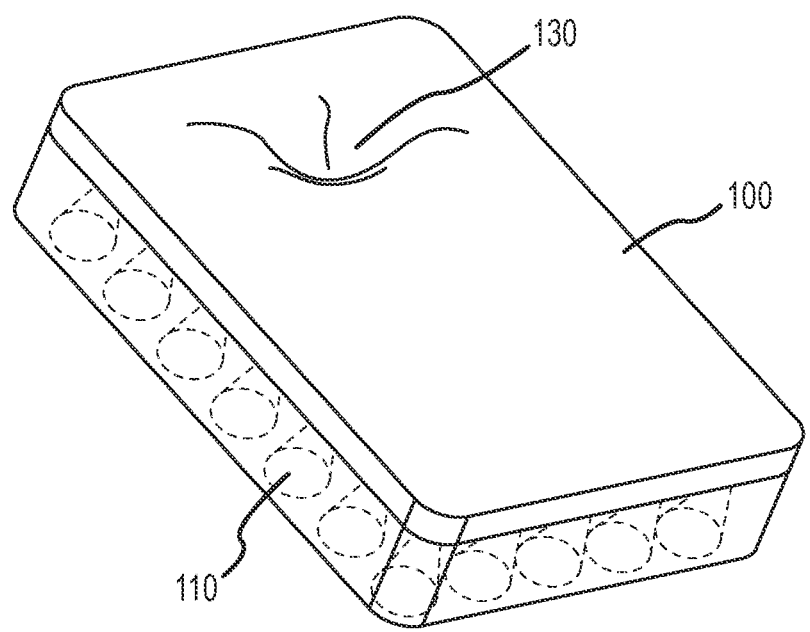
FIG. 7A is a top plan view of the elastomeric input device illustrated in FIG. 6A having a depression.
Figure 7B:
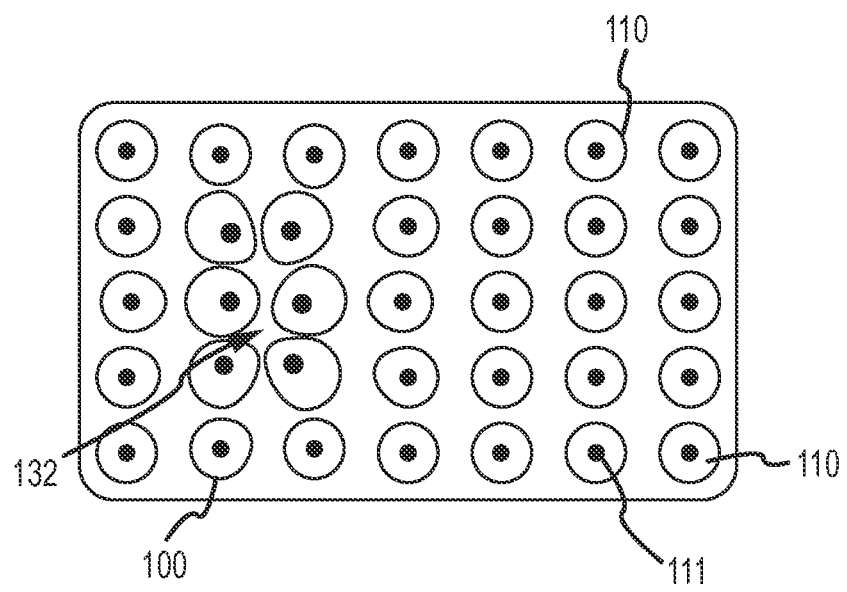
FIG. 7B is a bottom plan view of the elastomeric input device illustrated in FIG. 6A having a depression as illustrated in FIG. 7A.

As the cones 110 define a 3-D form or structure within the elastomeric body 102 and act as the tracking structure 104, the cones 110 may be accurately sensed by the tracking device 118 to determine the deformation of the elastomeric body 102. FIGS. 7A and 7B illustrate a deformation 132 in the elastomeric body 102 and the corresponding deformation 132 in the tracking structure 104. In these examples, as the elastomeric body 102 deforms, select cones 110 may also deform. Additionally, the cones 110 form an interrelated structure within the elastomeric input device 100 as their orientation along a height, width and depth of the elastomeric body 102 connects multiple points within the elastomeric body 102 in a relational manner.

The cones 110 may deform so that a bottom radius of each cone 110 may become misshapen and re-sized. Additionally, the sidewalls forming each cone 110 may deform the cavity to a non-circular shape also. These cone 110 deformations may be readily visible and detectable because the circular baseline pattern of each cone 110 is interpreted by the deformation. Also, the deformation of each cone 110 may create shadows as the sidewalls are deformed inwards or outwards. The deformation force 132 may then be tracked by determining the deformations to the sidewalls of each cone 110 (e.g., the angle of inward or outward change), the bottom perimeter of each cone 110, as well as the shadows (due to the displacement of the tracking structure 104 and the elastomeric body 102) produced during the deformation 132. For example, the cones 110 near the deformation force 132 may be most deformed, so that the bottom perimeter of each of the deformed cones 110 may transition from a generally circular shape to an ellipse, egg-shape, or the like. On the other hand, the cones 110 farthest away from the deformation 132 may be remain substantially the original shape and size. Cones 110 between the maximum deformation 132 and the minimum deformation may have lesser amounts of shape changes that decrease in magnitude approaching the outer limits of the deformation 132. The shape differences between the cones 110 being deformed and those cones 110 not being subject to a deformation force may provide deformation data that corresponds to the deformation force and position subjected to the elastomeric body 102.

Figure 15A:
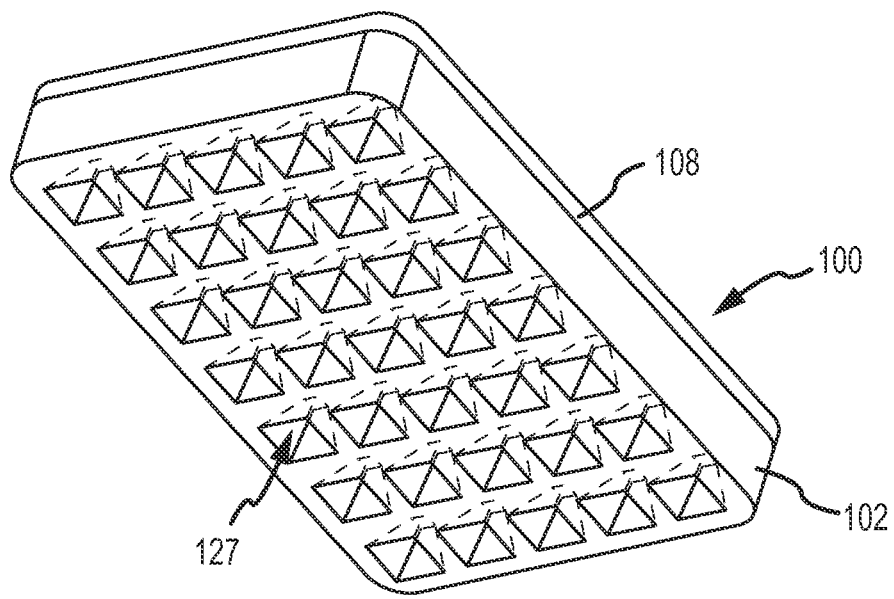
FIG. 15A is an isometric view of the elastomeric input device having a pyramid-shaped tracking structure.
Figure 15B:
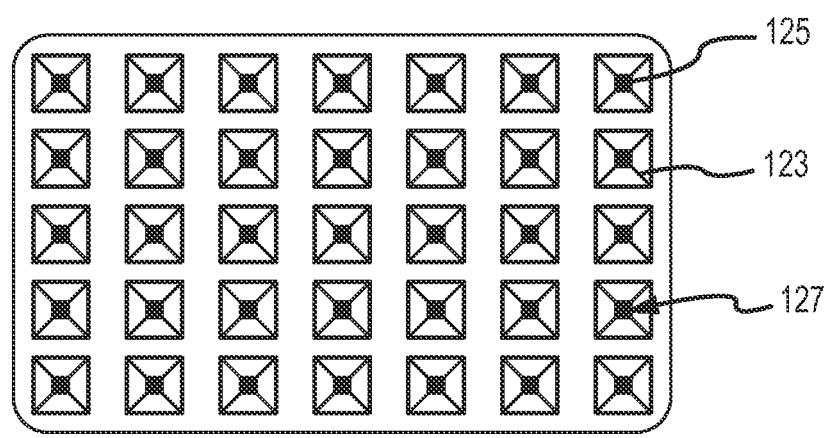
FIG. 15B is a bottom plan view of the elastomeric input device illustrated in FIG. 15A.

FIGS. 15A and 15B illustrate another example of the tracking structure 104. In this example, the tracking structure 104 may include a series of pyramids 127 interspersed throughout the elastomeric body 102. The pyramids 127 may have four sidewalls that form a rectangular perimeter on one end and angle upwards towards each other to form a point or smaller rectangular perimeter at a second end. Similar to the cones 110, the pyramids 127 may be formed so that a largest portion of the perimeter is at a bottom surface of the elastomeric body 102. The pyramids 127 then narrow upwards towards the top surface of the elastomeric body 102. The pyramids 127 may have a pointed tip, or as shown in FIGS. 15A and 15B, may have a flat top. The top 125 of the pyramids 127 may be a different color or configured to emit a different color than the elastomeric body 102, this allows for the tops 125 to act as an alignment point as the tracking structure 104 is deformed. Further, the pyramids may also include resolution enhancers 123 or alignment lines, (discussed in more detail below), which are additionally colored or otherwise trackable lines that may run along an corner of the pyramids 127 to provide additional tracking data.

As with the cones 110, the sidewalls of the pyramids 127 may flex inwards, twist, or be displaced vertically in response to a deformation. As the pyramids 127 are deformed, the resolution lines 123, the tops 125, and the sidewalls provide data to the tracking device 118 on the respective movements of the elastomeric body 102. For example, as a user deforms the elastomeric body 102 downward, the pyramids 127 in the area of the deformation will expand and their sidewalls may be displaced inwards and downwards. This deformation allows the tracking structure 118 to tracking the movements and deformations of the elastomeric body 102.

As shown in FIGS. 6A and 15A, the tracking structure 104 may include either cones 110 or pyramids 127 and the cones 110 or pyramids 127 may be positioned in approximately the same orientation as the other cones 110 or pyramids 127, respectively. However, the cones 100, pyramids 110 or other 3-D forms (e.g., geometric shapes, an array of crosses defined in the elastomeric body 102, etc.) positioned within the elastomeric input device 100 may be orientated in any manner. For example, there may be a first cone positioned as shown in FIG. 6A and a second cone positioned so that the tip 111 is formed on a side or bottom surface of the elastomeric body 102 (rather that along a top surface). Similarly, the tracking structure 104 may include a combination of objects, e.g., cones may be used along with pyramids, spheres, and other shapes. Furthermore, the tracking structure 104 may include a combination of a grid and 3-D forms or structures. As the cones 110, grid and pyramids 127 may include different sensitivities or tracking resolution, the tracking structure 104 is able to be customizable depending on the deformation data and sensitivity desired.

Referring now to FIGS. 6A, 6B, 15A, and 15B, in examples utilizing the cones 110 or the pyramids 127 as the tracking structure 104, the durometer of the elastomeric body 102 may be increased, as compared with those examples utilizing the tracking structure 104 illustrated in FIG. 3A. This is because the cones 110 or pyramids 127 may create air pockets, as the three-dimensional structures may be formed as apertures or cavities within the elastomeric body 102. Due to the air pockets within the cavities, the elastomeric input device 100 may be more easily manipulated by a user. Therefore, by increasing the durometer of the elastomeric body 102 when the tracking device 104 includes either cones 110, pyramids 127, or other three-dimensional structures, the deformability of the elastomeric input device 100 may remain at a consistent level, although a different tracking structure 104 is used. For example, if the tracking structure 104 is a grid the durometer of the elastomeric body 102 may be approximately 00 or 000; however, if the tracking structure 104 is a 3-D object (e.g., the cones 110 or pyramids 127), the durometer of the elastomeric body 102 may be approximately 10 Shore A. Also, the durometer may be increased for these examples, because if the durometer is sufficiently low, the air pockets formed by the cones 110 or pyramids 127 could cause the elastomeric body 102 to collapse on itself.

As shown in the various examples illustrated in FIGS. 3A and 6A, the tracking structure 104 may be a two-dimensional structure, e.g., grid (see, FIG. 3B) or may be a 3-D structure e.g., cone, multi-layer grid, (see FIG. 6B). In many examples, the tracking structure 104 may include elements or points that may be interconnected together. The interconnection between the points provides for more accurate measurement and tracking results. For instance, when the interacted grid is the stretched the full picture of the deformation is readily apparent because the interrelated tracking structure 104 provides more data of the deformation across a large area of deformation. Similarly, if a series of three-dimensional shapes (e.g., cones 110) are used, as the elastomeric body 102 is stretched, the stretching is apparent as the different points forming the three-dimensional shapes are moved, misshapen and positioned differently (see e.g., FIG. 7B) and may be repositioned or reoriented within the elastomeric body 102

Figure 13A:
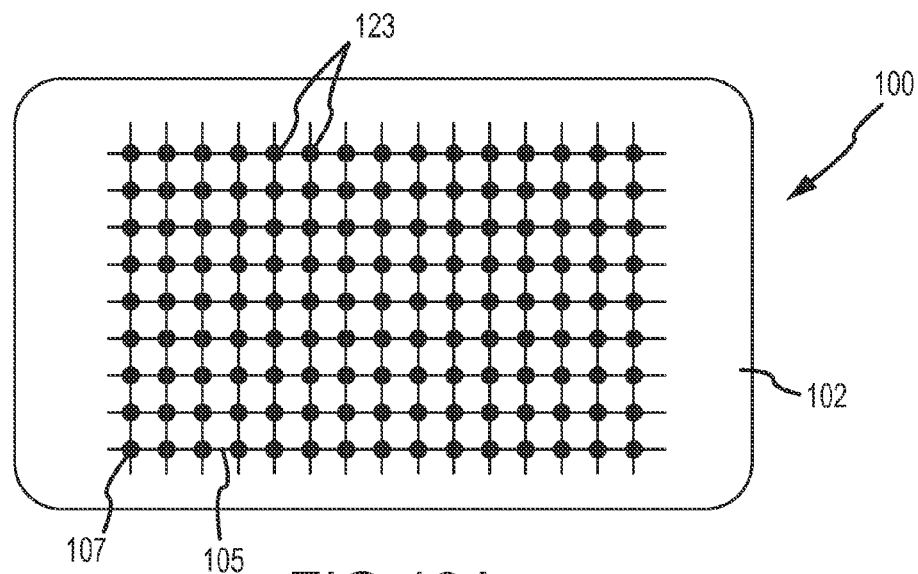
FIG. 13A is an isometric view of the elastomeric input device with the tracking structure including resolution enhancers located at an intersection of the members of the tracking structure.
Figure 13B:
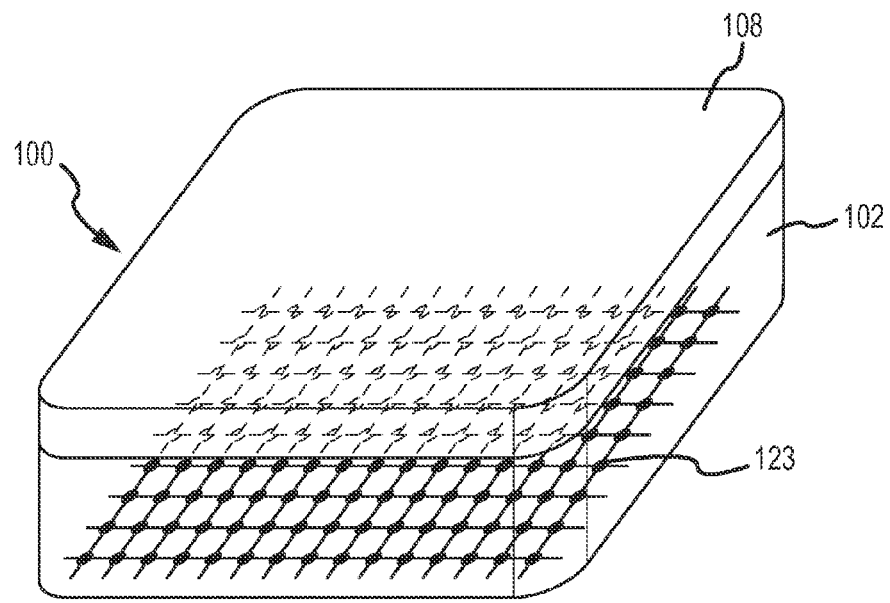
FIG. 13B is an bottom plan view of the elastomeric input device of FIG. 13A.

Referring now to FIGS. 6C, 13A, 13B, and 15B the tracking structure 104 may further include resolution enhancers 123 or alignment lines. The resolution enhancers 123 are used to further enhance the resolution or visualization of the output of the elastomeric input device 100, e.g., increase the tracking of the tracking structure 104. For example, as shown in FIGS. 13A and 13B the resolution enhancers 123 may be points placed at an intersection of lines 105, 107. The resolution enhancers 123 may be a separate color (or configured to emit a separate color) than the lines 105, 107 or may be configured to be the same color as the lines 105, 107. The resolution enhancers 123 provide an additional reference point for the tracking structure 104, so that deformations may be more readily visible.

Figure 6C:
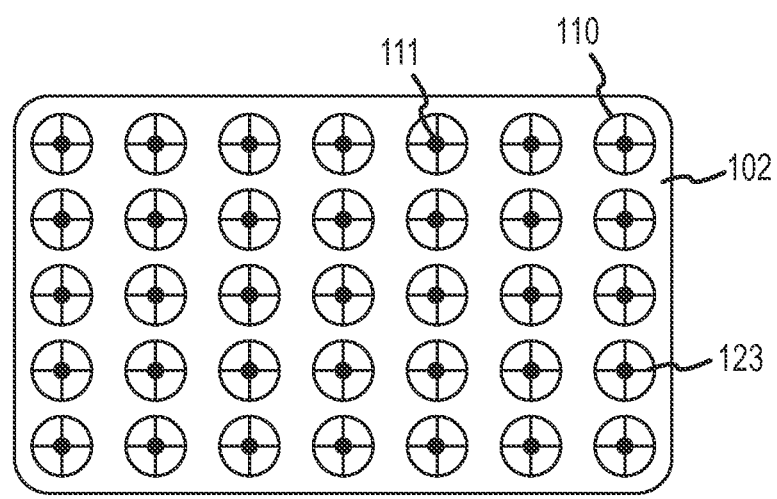
FIG. 6C is a bottom plan view of the elastomeric input device illustrated in FIG. 6A with the tracking structure having resolution enhancing lines interconnected within each cone-shape.

In another example, as shown in FIGS. 6C and 15B, the resolution enhancers 123 may be lines defined along a sidewall that intersect at a point or tip of each three-dimensional structure (e.g., the cones 110 or pyramids 127). The resolution enhancers 123 in FIG. 6C may resemble a cross-hair for a scope when viewed from a bottom of the elastomeric input device 100, and the resolution enhancers 123 in FIG. 15B may generally trace the intersections of the sidewalls for each pyramid 127. As with the resolution enhancers 123 in FIG. 13B, the resolution enhancers 123 for the cones 110 and pyramids 127 provide an additional reference line (or point) for better determining the deformations of the tracking structure 104. For example, the resolution enhancers 123 may reduce a complexity of deformation calculations for the cones 110, as shadows or angles of sidewall deformation may be harder to calculate than the changes and deformations the lines of the resolution enhancers 123. Specifically, if the cones 110 or pyramids 127 are deformed in a rotational manner (e.g., twisting), the resolution enhancers 123 may more clearly indicate the twist or rotation of the three-dimensional structures (cones 110, pyramids 127) than using the shadows, etc. of each sidewall of the structure to determine the rotation deformation. This is because the resolution enhancers 123 will rotate as the cones 110 or pyramids 127 are rotated or twisted, and because they are a separate color or are otherwise easily visible, the twisting will be more apparent.

The tracking structure 104 may also be a material that may not be visible to a human, but may react to various excitations. For example, the tracking structure 104 may be a material that may react to electromagnetism, illumination (e.g., infrared, ultra-violet), or sound waves. In one example, the tracking structure 104 may be formed of ferromagnetic material. This example allows the tracking structure 104 to be both driven (e.g., by displacing magnets around the elastomeric input device 100 that react with the tracking structure 104) and sensed by the tracking device 118. In another example, the tracking structure 104 may include fluorescent materials or other light reflecting/producing materials that may emit different wavelengths when a force is applied. This example may allow portions of the tracking structure 104 to essentially change colors when they are deformed. In still another example, the tracking structure 104 may include a flexible material having fine iron particles dispersed throughout. This type of material is disclosed in U.S. patent application Ser. No. 12/346,470 entitled "Method and Apparatus for Control of a Flexible Material Using Magnetism," which was incorporated in reference in its entirety above.

In these examples, the material or elements forming the tracking structure 104 may be operably connected within or formed as a part of the elastomeric body 102. The tracking device 118 may be varied depending on the desired tracking structure 104. For example, the tracking structure 104 may be visible and a visible light sensitive camera may be used to track its position, or the tracking structure 104 may be practically invisible metallic particles and electromagnetic sensors may be used to track its position.

The tracking structure 104 may also be configured to emit a light color (e.g., different UV spectrum) than the elastomeric body 102. This may allow for better resolution in tracking the deformations of the tracking structure 104. Additionally, certain sections or portions of the tracking structure 104 may be different colors or configured to emit different colors than other portions of the tracking structure 104. This may allow the resolution for the system to be enhanced as the tracking device 118 may better determine the deformations of the tracking structure 104.

Figure 11:
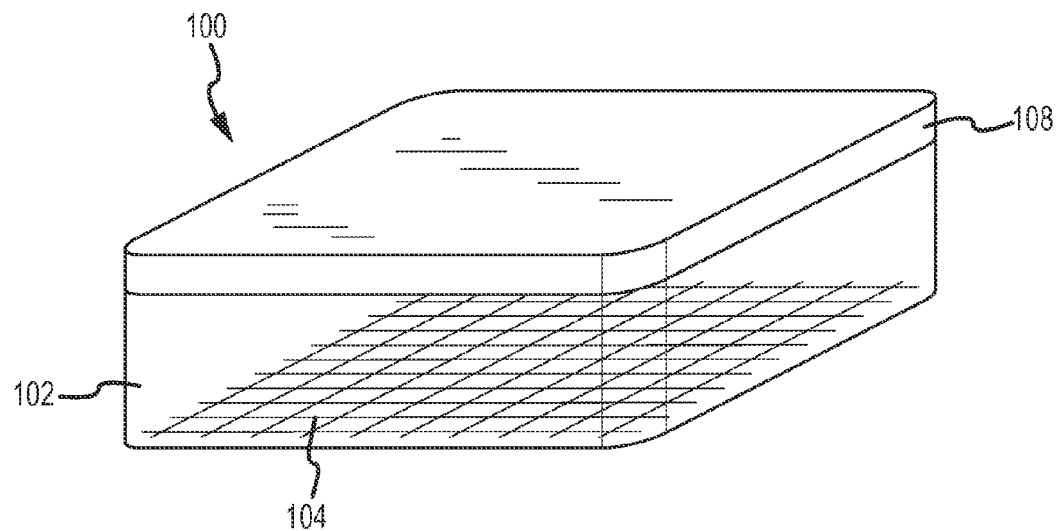
FIG. 11 is an isometric view of the elastomeric input device with the tracking structure located near a bottom of the elastomeric body.

FIG. 11 is an isometric view of a one example of a tracking structure 104 location within the elastomeric body. Referring now to FIGS. 3A and 11, the tracking structure 104 may be located at various heights within the elastomeric body 102. The height of the tracking structure 104 may determine the relative sensitivity of the elastomeric input device 100. For example, if the tracking structure 104 is located in a middle of the elastomeric body 102 (as shown in FIG. 3A), it may be more sensitive (i.e., deform more severely to the same deformation) than if the tracking structure 104 is located at a bottom of the elastomeric body 102 (as shown in FIG. 11).

However, the sensitivity of the tracking structure 104 may not only be related to its position within the elastomeric body 102, but also the relative durometer of the elastomeric body 102. For example, if the durometer of the elastomeric body 102 is relatively low the tracking structure 104 may be positioned near a bottom of the elastomeric body 102 and the sensitivity of the elastomeric input device 100 may be approximately the same as if the tracking structure 104 were in the middle of the elastomeric body 102 and the elastomeric body 102 had a high durometer. This is because the higher the tracking structure 104 is positioned within the elastomeric body 102, the more nuances and curves of the deformations may be tracked, as the tracking structure 104 may deform in a larger manner (as there is more material to deform downwards with). Thus, by varying both the durometer of the elastomeric body 102 and the position of the tracking structure 104, the sensitivity of the elastomeric input deice 100 may be varied.

Figure 14A:
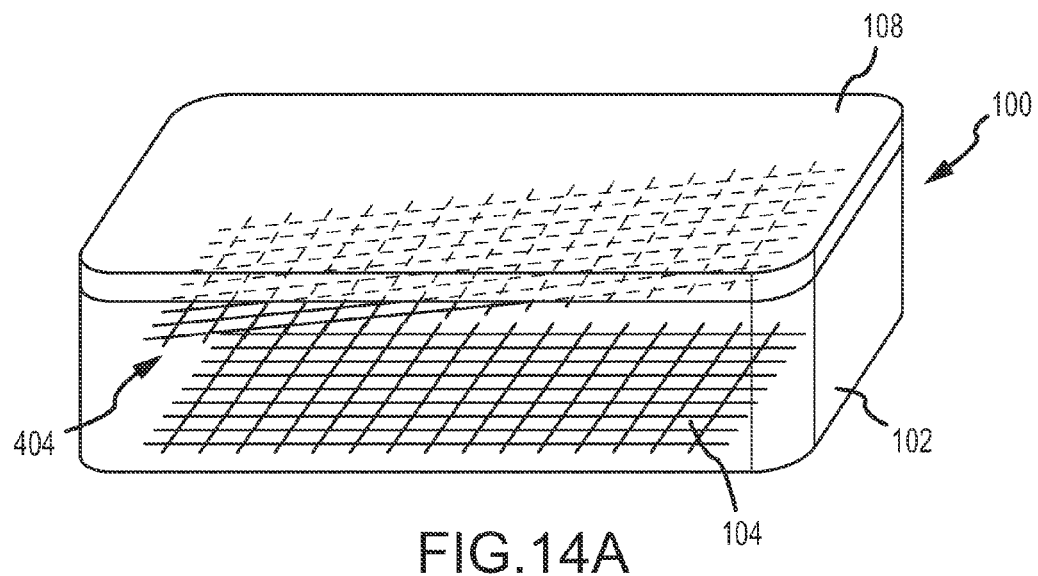
FIG. 14A is an isometric view of the elastomeric input device having two tracking structures angled with respect to each other within the elastomeric body.
Figure 14B:
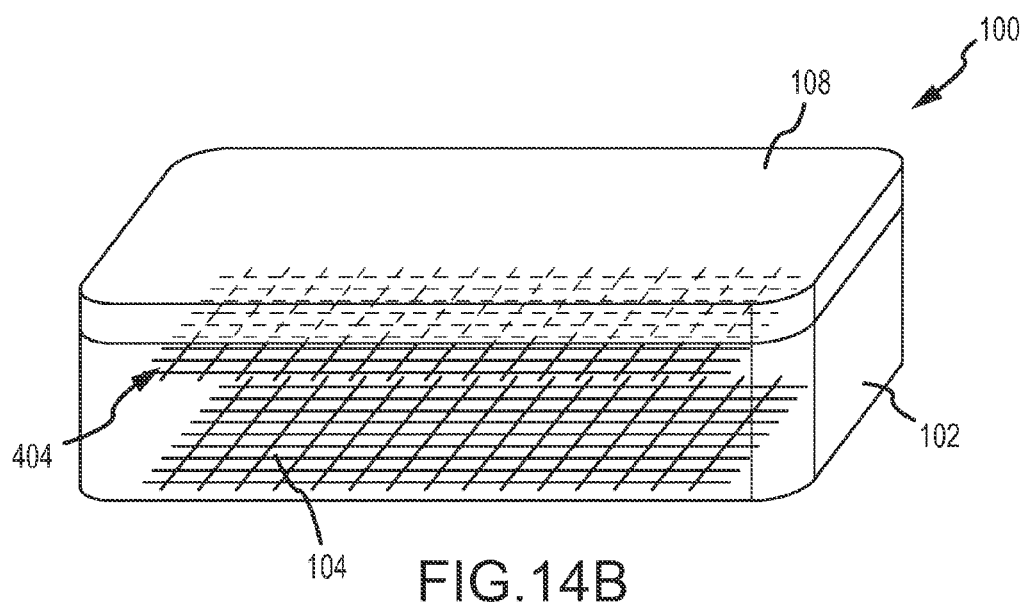
FIG. 14B is an isometric view of the elastomeric input device having two tracking structures spaced intermittently within a height of the elastomeric input device.
Figure 14C:
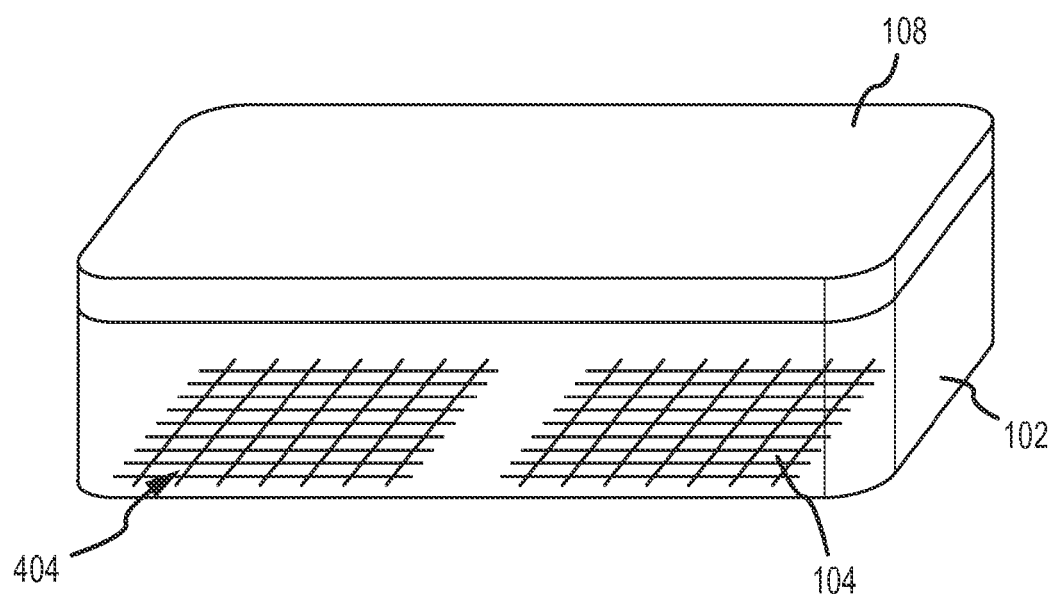
FIG. 14C is an isometric view of the elastomeric input device having two tracking structures positioned substantially adjacent one another within the elastomeric body.

Additionally, there may be multiple tracking structures 104 within the elastomeric body 102. These configurations may provide additional data and resolution for the elastomeric input device 100. FIG. 14A illustrates an angled second tracking device 404 positioned within the elastomeric input device 100 over the tracking device 104. FIG. 14B illustrates the second tracking structure 404 positioned over and substantially parallel to the tracking structure 104, and FIG. 14C illustrates a second tracking structure 404 positioned directly next to the tracking structure 104. As can be seen from FIGS. 14A-14C, a second tracking device 404 may be positioned at substantially any position within the elastomeric body 102 relative to the tracking structure 104. The second tracking structure 404 provides additional data and increases the sensitivity of the elastomeric input device 100. This is because the tracking device 118 may track the deformations of both the tracking structure 104 and the second tracking structure 404, and may track deformations of each tracking structure 104, 404 relative to each other. Also, it should be noted that substantially any number of tracking structures 104, 404 in substantially any position within the elastomeric body 102 may be included in the elastomeric input device 100 to further increase the sensitivity of the device 100.

Figure 12:
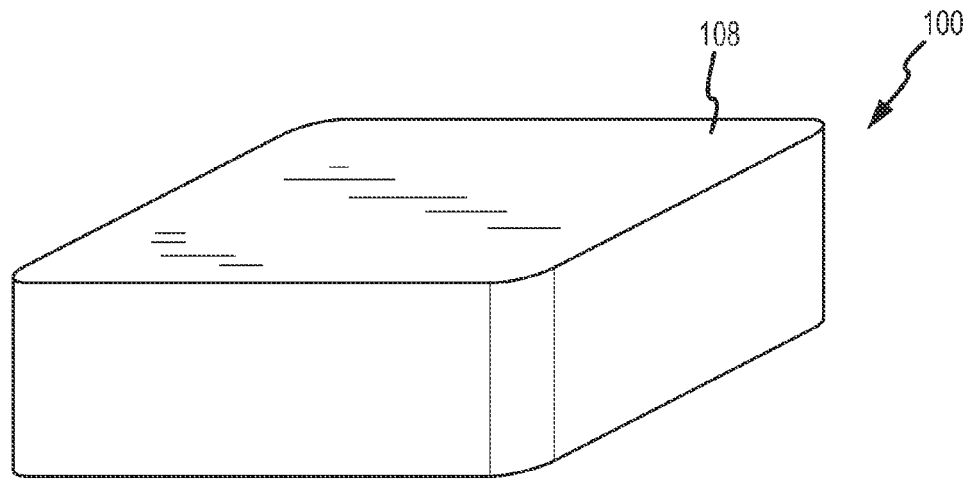
FIG. 12 is an isometric view of the elastomeric input device with the membrane extending over the top and sides of the elastomeric body.

In another example of the elastomeric input device 100, the membrane 108 may be operably connected to the elastomeric body 102 such that the membrane 108 covers the top surface and sides of the elastomeric input body 102. FIG. 12 is an isometric view of the elastomeric input device 100 where the top and sides of the elastomeric body 102 are encased within the membrane 108, such that only a bottom surface of the elastomeric body 102 may be uncovered by the membrane 108. As discussed above, the membrane 108 may include a reflective material on its bottom surface. In this example, the reflective material may cover the inner surface of the membrane 108 so that light may exit the elastomeric input device 100 substantially only through a bottom surface of the elastomeric input device 100. This may be beneficial as in some system examples the tracking device 118 may be configured to be placed beneath the elastomeric input device 100 and substantially all of the light reflected within the elastomeric input device 100 may be directed towards the tracking device 118. It should be noted that the uncovered portion of the elastomeric body 102 may be any surface of the body 102, depending on the desired location of the tracking device 118.

The membrane 108 may also have sections of varying textures on a top surface to provide a non-visual alert or notification for the user. For example, the elastomeric body 102 may have sections of varying durometer values and the section of the membrane 108 covering a section with a first durometer value may be relatively smooth and a second section of the membrane 108 covering the a section having a second durometer value may be relatively rough. In another example, the membrane 108 texture may be varied to correspond to portions of the tracking structure 104 which may correspond to different inputs, e.g., one texture may represent the tracking structure 104 for creating mountains and another texture may represent the tracking structure 104 for creating valleys on the display grid 128.

Figure 8:
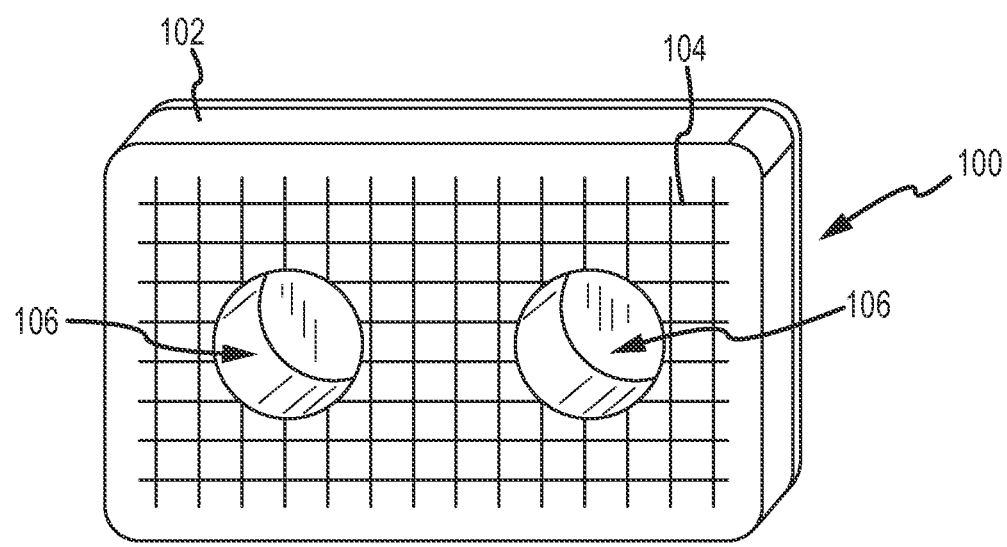
FIG. 8 is an isometric view of the elastomeric input device illustrated in FIG. 3A having receiving apertures for accepting a user's hands.

The elastomeric body 102 may be any number of different shapes, for example as shown in FIG. 8, the elastomeric body 102 may include receiving cavities formed therein. The shape of the elastomeric body 102 may be determined by any shape that may be molded, injected, machined or otherwise formed with a pliable, flexible material. Additionally the elastomeric body 102 may be hollow, partially hollow, and/or may include apertures or cavities. For example, as shown in FIG. 8, the elastomeric body 102 may include a receiving aperture 106 (or multiple receiving apertures 106). The receiving apertures 106 may be configured to receive a user's hands. For example, each hand may be inserted into a respective receiving aperture 106 within the elastomeric body 102. It should be noted that the elastomeric input device 100 may include any number of receiving apertures 106, and the receiving apertures 106 may be configured to receive smaller or larger elements than a user's hand, e.g., arm, leg, the entire body of a user, etc. In other examples, the elastomeric body 102 may be wrapped around an object, operably connected into a wearable device (e.g., shoes, clothing), or the like. Hands inside the elastomeric body 102 help manipulate the tracking structure 104 in a different manner and dimension than the example shown above.

The elastomeric body 102 and the tracking structure 104 may be deformed or manipulated in a number of different manners. Additionally, each of the manipulations or deformations may provide a variety of inputs to a computing device. For example, the elastomeric input device 100 may be used to track analogue interactions (e.g., pushing and pulling), gestures (e.g., sticking two fingers into the elastomeric body 102 and rotating the fingers), whole device interaction (e.g., pushing and rotating the entire elastomeric input device 100. As the elastomeric input device 100 may provide electronic input to a computing device running or communicating with any application or device, the deformation and manipulations may be customized to accommodate the desired inputs of the device, application, or system.

The elastomeric input device 100 may also include a haptic display device. The haptic display device may be operably connected to the elastomeric input device 100. In some examples, the haptic display device may be associated with the membrane 108 and/or the elastomeric body 102. The haptic display devices may be, for example, vibro-tactile actuators, ultrasonic waves, and so on. In these examples, the user may feel a vibration or movement of the elastomeric input device 100 as he or she manipulates or deforms the elastomeric input device 100. These examples may allow users to have additional feedback (other than the actual deformation for the elastomeric body 102) regarding the type, force, and position of his or her manipulations of the elastomeric input device 100.

The elastomeric input device 100 may also include accelerometers (not shown) operably connected thereto. The accelerometers may be used to track movements of the elastomeric input device 100 in space, e.g., all three dimensions. For example, in addition to deforming, the elastomeric input device 100 may be moved in a variety of directions (i.e., rotated and/or translated) as it is being deformed. Thus, the accelerometers may provide additional data corresponding to the elastomeric input device 100.

In some examples, images or lights may be projected within the elastomeric input device 100. In these examples, the elastomeric body 102 may be transparent or partially transparent. For example, reflective optical elements (e.g., mirrored glass) may be inserted into the elastomeric body 102, then images or lights may be projected into the elastomeric body 102 from sides, top or bottom. The reflective optical elements may then reflect and refract the images and within the elastomeric body 102 and to the tracking devices 118, 119. The inter-reflection of the light rays (e.g., from light sources 128) may provide inter-reflection light artifacts within the elastomeric body 102. These reflections may help to provide the tracking devices 118, 1199 with direct rays versus reflected rays.

Figure 10:
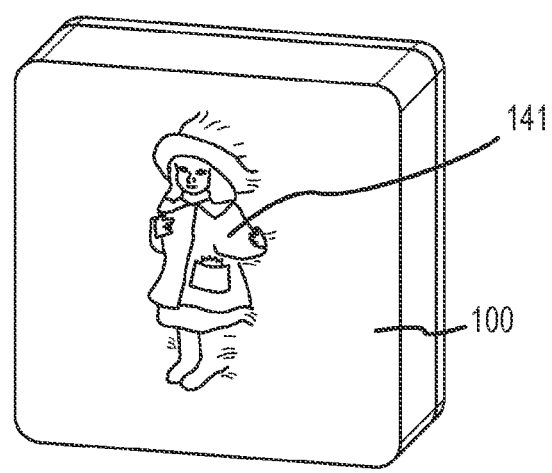
FIG. 10 is an isometric view of the elastomeric input device having a three-dimensional image projected therein.

In one example, a dynamic stereo image (e.g., 3-D image) may be projected into the elastomeric input device 100. FIG. 10, illustrates a 3-D image 141 projected into the elastomeric input device 100. In these examples, the elastomeric input device 100 may be used as both an input device and a display device. For example, this may allow the elastomeric input device 100 to be used to create a deformable 3-D display, e.g., by projecting the three-dimensional image 141 into the deformable elastomeric input device 100. The user may then be able to manipulate a virtual 3-D image (i.e., the image displayed within the elastomeric input device 100) by manipulating the elastomeric input device 100. These examples may allow for a user to have a more realistic interaction with the displayed images.

Alternative Examples for the Input System

Figure 16:
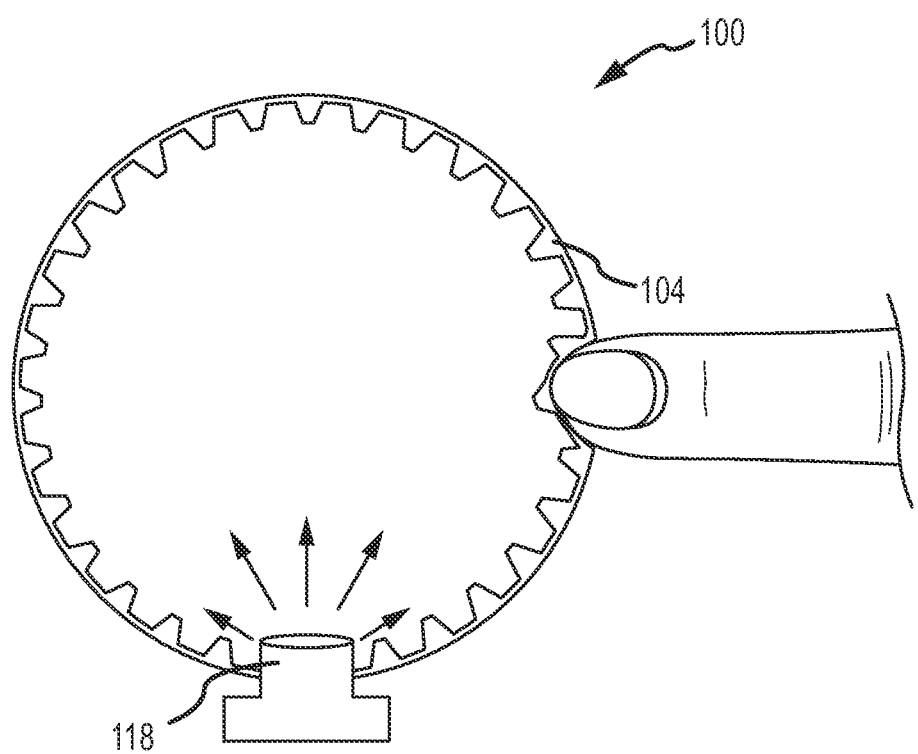
FIG. 16 is a front elevation view of the elastomeric input device having a spherically shaped elastomeric body with the tracking device partially enclosed therein.

In some examples, the tracking device 118 may be inserted into the elastomeric input device 100. For example, the tracking device 118 may be inserted into the receiving aperture 106 (FIG. 8) or other aperture within the elastomeric input device 100. The elastomeric input device 100 may be shaped as a sphere and the tracking device 118 may be a wide-angle camera inserted therein. FIG. 16 is a front elevation view of a tracking structure 118 inserted within the elastomeric body 102 with a user deforming a side of the elastomeric input device 100. As shown in FIG. 16, the elastomeric input device 100 may resemble a snow-globe having a mounting platform, where the mounting platform is the tracking device 118, which may extend partially into the spherical body.

In the example illustrated in FIG. 16, the user may squeeze the elastomeric input device 100 in order to provide an input (e.g., deformation) to the device 100 and the tracking device 118 may determine the deformations of the tracking structure 104 from within the elastomeric input device 100. Additionally, the tracking structure 118 may be configured to rotate around a select axis in order to capture substantially all of the deformation of the elastomeric body 102. Also, depending on the rotation axis of the tracking structure 118, the type of lens of the tracking structure 118, as well as its placement within the elastomeric body 102, an additional tracking structure 118 may also be used. In this example, the additional tracking device 118 may assist in capturing the deformations of the elastomeric body 102, that may be hidden from view from the first tracking structure 118. Similarly, in other examples, capacitive sensors may be integrated throughout the elastomeric body 102 in order to track deformations of the elastomeric input device 100.

In some examples, the support structure 116 and/or input system 200 may also include a tracking sensor (not shown) for tracking a user's hand, fingers, etc. in addition to the elastomeric input device 100. For example, a tracking sensor may be positioned on the support structure 116 or the elastomeric input device 100 and may track a user's hand position on top of the membrane 208. The tracking sensor may be any type of position sensor, for example, a laser tracking system, infrared illumination system, capacitive sensor, etc. These examples provide further precision in tracking inputs to the elastomeric input device 100, as the tracking structure 104 is combined with the input from the tracking sensor to provide additional deformation data. For example, data received from the tracking device 118 may be combined, filtered or the like with the data from the tracking sensor to provide for more accurate and precise deformation data.

Figure 9:
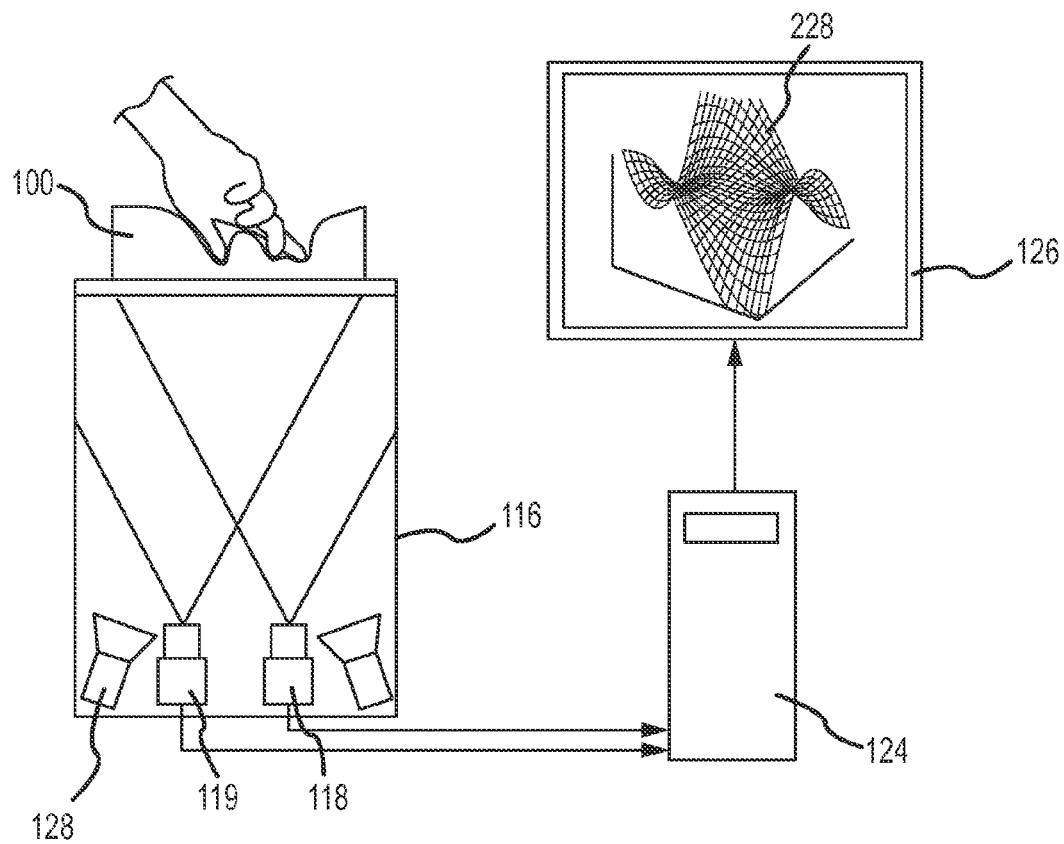
FIG. 9 a block diagram of a system for tracking three-dimensional movements utilizing two tracking devices.

FIG. 9 illustrates the input system 202 utilizing two tracking devices. The second tracking device 119 may be operably connected to the computing device 124, and may be substantially similar to the tracking device 118. The combination of two tracking devices 118, 119 may allow for more precise data capturing. For example, if the two tracking devices 118, 119 are cameras, the computing device 124 may use depth recovery algorithms to estimate the deformation of the elastomeric body 102 (via the tracking structure 104). For example, the display grid 228 corresponding to the position data captured by the display devices 118, 119 may include more complex graphical displays to track the movement of the tracking structure 104.

In other examples, the tracking device 118 (or devices) may be placed on a side or top of the elastomeric input device 100. In these instances, the tracking device 118 may track the tracking structure 104 through a side or top of the elastomeric input device 100, rather than a bottom of the elastomeric input device 100. This example may allow the support structure 116 to be reduced in height, as the elastomeric input device 100 may not need to be positioned over the tracking device 118, but may be positioned adjacent the tracking device 118.

Alternative Methods for Capturing Deformations of the Elastomeric Input Device

Figure 18A:
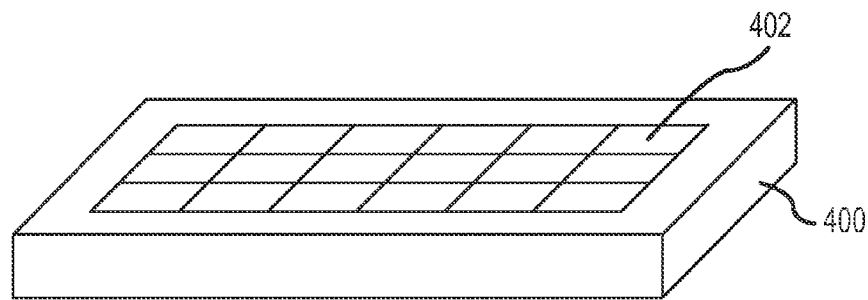
FIG. 18A is an isometric view of a model for the elastomeric input device.
Figure 18B:
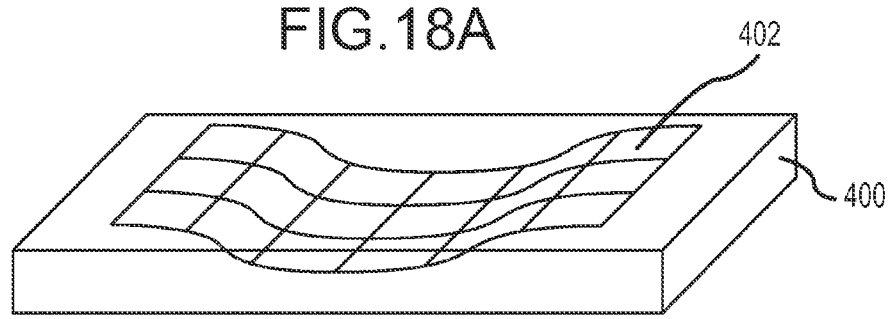
FIG. 18B is a isometric view of the model of FIG. 18A in a deformed configuration.
Figure 18C:
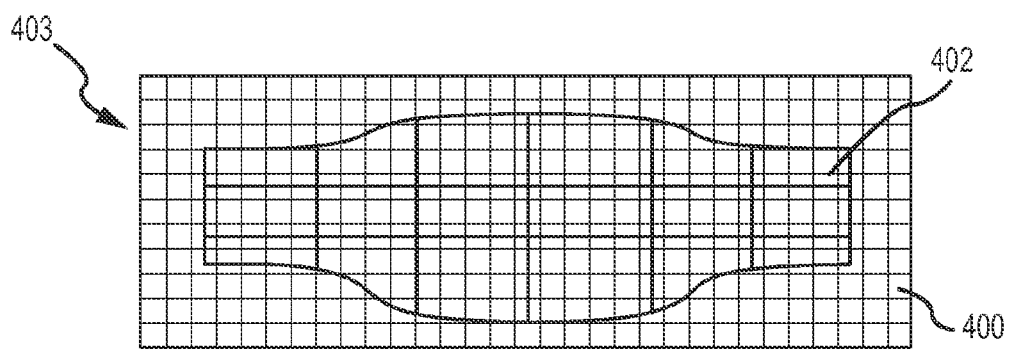
FIG. 18C is a bottom plan view of the model of FIG. 18B illustrating a pattern due to the deformation.
Figure 18D:
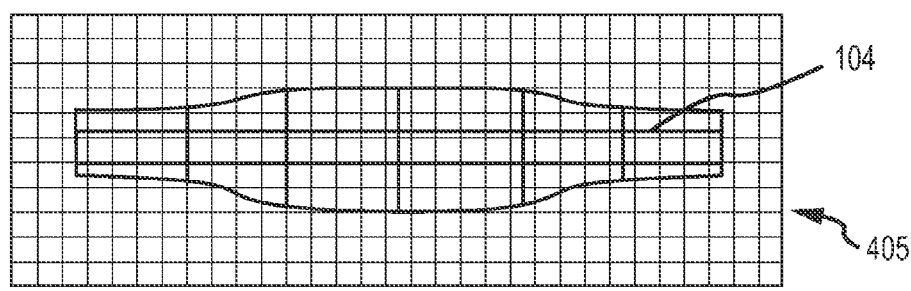
FIG. 18D is an image of a bottom plan view of the elastomeric input device in a deformed configuration.

FIGS. 18A-18D illustrate an example of a method that may be used to capture the deformations of the elastomeric input device 100. As shown in FIG. 18A, the method may include utilizing a model 400 of the elastomeric input device 100 including a pattern 402 of the tracking structure 104 in three-dimensions. Referring now to FIG. 18B, the pattern 402 may be deformed (virtually) in the model 400 under particular deformation parameters (such as height, width, force, etc.). A synthesized image 403 may be produced based on the known deformation, and the pattern 402 may be captured in the image 403. As shown in FIG. 18C, the model deformation reflected in the synthesized image 403 may be similar to, but not exactly the same as the actual observed image of the actual deformation of the tracking structure 104 shown in FIG. 18D. The two images 403, 405 may be compared, and the model pattern 400 may be iteratively deformed until the synthesized image 403 may approximately match the actual observed image 405 of the tracking structure 104.

The comparison of both images 403, 405 may allow for the deformation parameters to be determined based on those parameters that may minimize the difference between synthesized image 403 and the actual image 405. In other words, a three-dimensional model may be deformed under known parameters until the synthesized image 403 roughly approximates the observed or actual image 405. Then, as the model deformation parameters are known for the synthesized image 403, the approximate deformation patterns for the actual image 405 may be determined. The operations illustrated in FIGS. 18A-18D may be performed incrementally from frame to frame and the comparison of the deformation parameters can be solved using a gradient-based optimization. Also, it should be noted that the model and synthesized image 403 may be done in two-dimensions rather than three-dimensions. By using two-dimensions, the deformations of the elastomeric input device 100 may be tracked in two-dimensions and then mapped into three-dimensions in order to be compared with the synthesized image 403. Mapping two-dimensional images to a three-dimensional model is discussed below with respect to FIGS. 19A-19C.

Figure 19A:
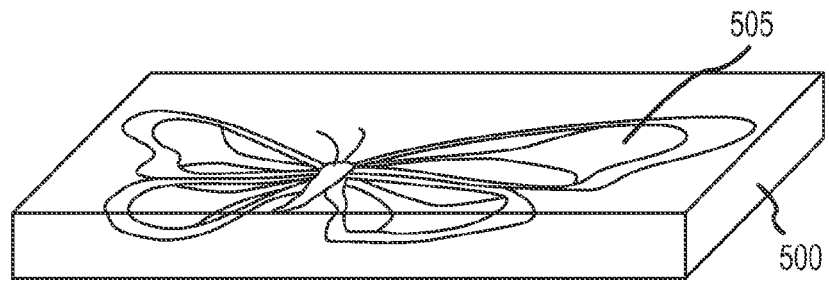
FIG. 19A is an isometric view of an example of the elastomeric input device where the tracking structure is a pattern.
Figure 19B:
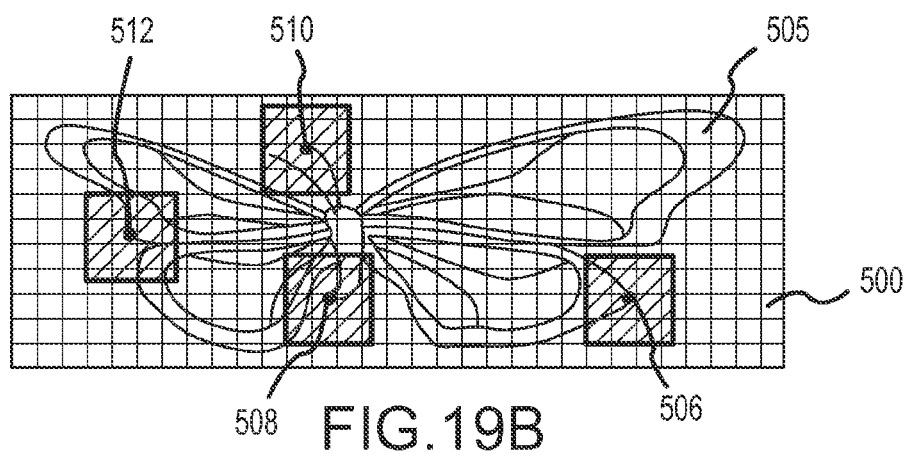
FIG. 19B is a bottom plan view of the elastomeric input device of FIG. 19A.
Figure 19C:
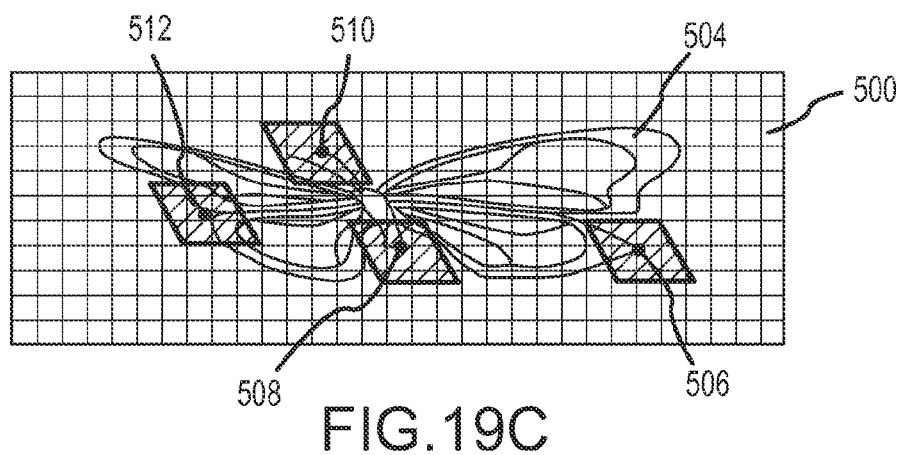
FIG. 19C is a bottom plan view of the elastomeric input device of FIG. 19A in a deformed configuration.

FIGS. 19A-19C illustrate another example of a method for determining the deformations of the tracking structure 104. FIG. 19A is an isometric view of an example of an elastomeric input device 500 where the tracking structure 504 may include a pattern. FIG. 19B is a bottom plan view of the elastomeric input device 500 showing the tracking structure 504, which in this example, is a butterfly. However, substantially any type of pattern may be used and the pattern may be overlaid on the tracking structure 104, or may form the tracking structure 504. Salient points of the tracking structure 504 may then be mapped or otherwise determined with respect to a position on the elastomeric input device 500 prior to deformation. The points 506, 508, 510, 512 may represent specific areas or points on the tracking structure 504. For example, as shown in FIG. 19B, the first point 506 may represent an outer side tip of a point of the wing of the butterfly, the second point 508 may represent a bottom tip of a body of the butterfly 508, a third point 510 may represent a tip of an antenna of the butterfly, a fourth point 512 may represent a point on another wing of the butterfly. In other embodiments, for example, if the tracking structure includes cones or frustums, the points may be the center point of each geometric shape, a sidewall of each shape, and so on.

Once the points 506, 508, 510, 512 are mapped or otherwise determined, the elastomeric input device 500 may be deformed. FIG. 19C is a bottom plan view of the elastomeric input device 500 deformed, illustrating the deformation of the tracking structure 504. As the tracking structure 504 is deformed correspondingly with the elastomeric input device 500, the points 506, 508, 510, 512 may be repositioned. For example, the deformation applied to the elastomeric input device 500 in FIG. 19C has stretched the points 506, 508, 510, 512 so that they are spaced apart from one another. The deformation of the tracking structure 504 may be determined by matching the points 506, 508, 510, 512 between the pre-deformed tracking structure 504 (FIG. 19B) and the deformed tracking structure 504 (FIG. 19C). The points 506, 508, 510, 512 may be matched together using a variety of different imaging techniques, for example, Scale-invariant feature transform (SIFT), Histogram of Oriented Gradients (HOG), etc.

This technique could be used to determine two-dimensional deformations or three-dimensional deformations. For example, if two tracking devices 118 are used or the tracking device 118 is a stereo camera pair, the points 506, 508, 510, 512 may be mapped in three-dimensions, providing information on the deformation in three-dimensions.

FIG. 20A is a block diagram illustrating a database of hand articulations and the resulting deformation pattern of the tracking structure 104. FIG. 20B is a block diagram of an observed deformation in the tracking structure 104 where the hand articulation is determined based on the known hand articulations of FIG. 20A. FIG. 20C is the determined hand articulation producing the deformation in FIG. 20B. The computing device 124 may store hand articulations 602, 604, 606 and their corresponding deformation patterns 603, 605, 607 (e.g., images of the tracking structure 104 deformed due to those particular articulations). The computing device 124 may store substantially any number of different hand articulations, representing a variety of different deformation forces that may be applied to the elastomeric input device 100.

The hand articulations 602, 604, 606 and their corresponding patterns 603, 605, 607 may be determined (when originally produced) by a data glove or motion capture system. For example, a user may wear a data glove and then deform the elastomeric input device 100. The resulting hand movements or articulations and their produced patterns (e.g., deformations to the tracking structure 104) may then be stored in the computing device 124.

Now referring to FIG. 20B, after a number of different hand articulations 602, 604, 606 are determined, an observed pattern 608 of the tracking structure 104 under an unknown deformation may be compared with the patterns 603, 605, 607. Comparing the unknown pattern 608 with the known patterns 603, 605, 607, the computing device 124 (or user) may then determine the hand articulation 610 (and corresponding deformation) performed by the user that deformed the elastomeric input device 100. In other words, the known hand articulations 606, 608, 608 and patterns 603, 605, 607 may provide a look up table or regression in order to estimate or predict the actual deformation or articulation 610 by the user.

In another example, deformations to the tracking structure 104 may be created as a planar pattern and a model of the deformation (e.g., the model 400) may be modeled as a set of connected image patches. The image patches may then be encoded by an equivalent of linear springs. The linear springs may then be deformed to create the actual pattern of the deformation, and when the observed pattern created, the deformation force will be substantially known by determining the force applied to each particular area of the tracking structure 104 by the linear springs.

Applications for the Elastomeric Input Device

The elastomeric input device 100 may be used in a variety of applications. Essentially, any application that may receive inputs from an object or device may utilize the elastomeric input device 100. A non-exhaustive list of potential applications may include applications where the elastomeric input device 100 may be used to control the movements of robots, control unmanned vehicles (e.g., remote control cars, airplanes), control medical devices (e.g., remote surgery), control manned vehicles (e.g., automobiles, bicycles, wheel chairs, airplanes, rockets), or may be used to control computer graphic animation. For example, the elastomeric input device 100 may be operably connected to a finger of a robot. As the robot grasps or grips an object, precise profile and properties of the grasped or gripped item may be determined. This allows the behavior of the robot to be adjusted as need, depending on the input received from the elastomeric input device 100. In another example, the elastomeric input device 100 may be able to determine if the robot is gripping a smooth or rough surface object, which may change or alter the gripping or grasping force.

Furthermore, the elastomeric input device 100 may be used as a universal controller for several users simultaneously. As a universal controller, the elastomeric input device 100 may allow each user to control aspects of a video game or the like simultaneously. For example, two separate users may manipulate different portions of the elastomeric input device 100 simultaneously, producing two separate deformation inputs.

The elastomeric input device 100 may also be operably connected to wearable items, e.g., shoes, clothing. These examples may allow the elastomeric input device 100 to track or record the movements, etc. of the user. For example, the elastomeric input device 100 may be used to track a user's foot profile as he or she runs or walks. This may be beneficial to adjusting a user's stride or fitting a user for shoes. In another example, the user may wear a portion fo the elastomeric input device 100, and the user's movements may be tracked via the tracking device to record his or her movements. In one example, the elastomeric input device 100 may utilize the cones as the tracking structure 104, and the cones may be faced outwards (away from the body of the user) and therefore, the deformations of the tracking structure 104 may be more easily determined while the user is moving.

Figure 17A:
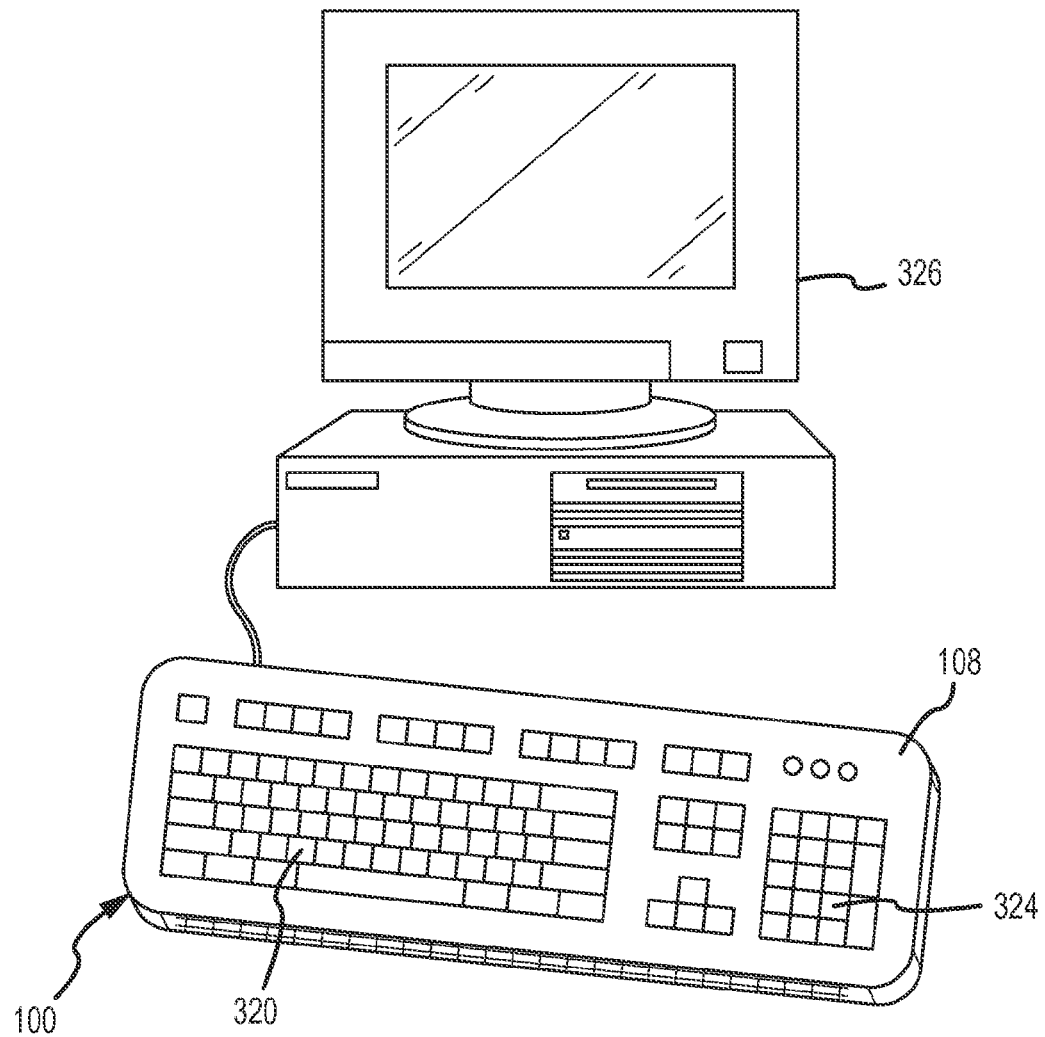
FIG. 17A illustrates a system for utilizing the elastomeric input device as an input for a computing device.
Figure 17B:
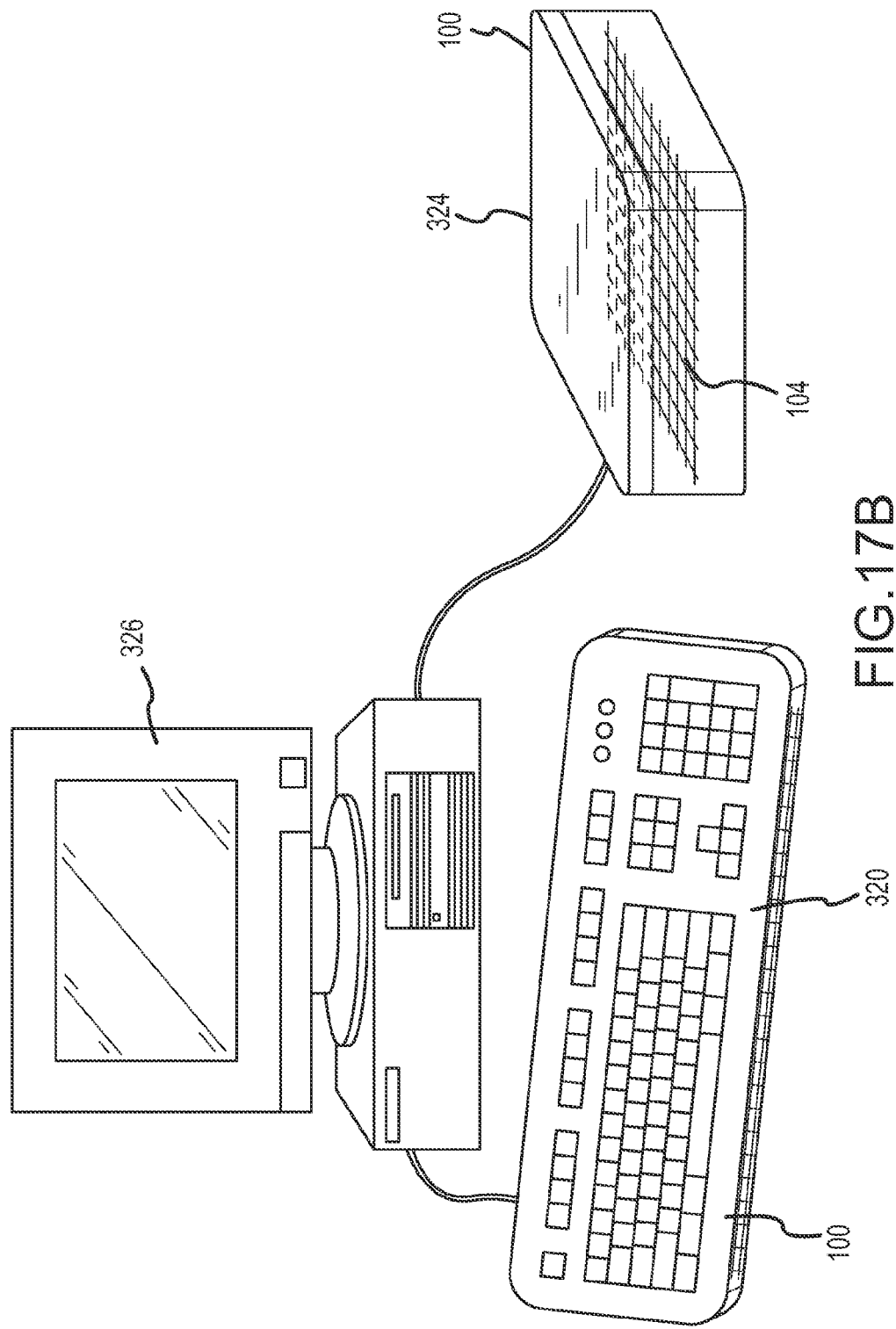
FIG. 17B illustrates the system of FIG. 17A with the elastomeric input device forming two separate input devices for the computing device.

FIGS. 17A and 17B illustrate the elastomeric input device 100 being used as an electronic input for a computer 326. As shown in FIG. 17A the elastomeric input device 100 may include a keyboard portion 320 and a mouse portion 324. The keyboard portion 324 of the elastomeric input device 100 may include keys or symbols painted, affixed, or otherwise indicated on the membrane 108. The keys may resemble those used for typical computer keyboards, specialized keyboards, or other input devices. A user may then press on the elastomeric input device 100 on top of the respective key, and the tracking device 118 (not shown) may then determine the deformations of the elastomeric body 102 and correlate the deformations to the respective key, inputting that key as an input to the computer 326.

Similarly, the elastomeric input device 100 may include a mouse portion 324, which may either be integrated with the keyboard 320 portion (see, e.g., FIG. 17A) or may be separate from the keyboard portion 320 (see, e.g., FIG. 17B). The mouse portion 324 may be used to provide scrolling, navigating, clicking and other inputs for the computer 326. For example, a user may push his or her finger upwards or downwards along the elastomeric body 102 to move a cursor upwards and downwards on a display screen, or may deform the elastomeric body 102 downward to select or click an option on the computer 300, and so on.

In still other examples, the elastomeric input device 100 may be used to measure reference deformation, such as acceleration. The elastomeric input device 100 may be used to create a seat, chair, or bed in which a user may sit or lay in. Then, as the user is accelerated, for example, in a car, rocket, or the like, the user may deform or compress into the elastomeric input device 100 due to the acceleration force. This may allow the tracking device 118 to track deformations and determine the relative acceleration of the user within the chair, bed or the like. Also, due to the relative flexibility of the elastomeric input device 100, the elastomeric body 102 may also act to protect the user while he or she is accelerating.

The elastomeric input device 100 may also be used to monitor health of a user. For example, a bed may be created with the elastomeric input device 100, which may then determine a user's daily movements or deformations. Tracking a user's daily movements may be helpful when monitoring an injured person, e.g., a user that is bedridden. Additionally, the elastomeric input device 100 may be purposefully manipulated by a user to determine the user's hand strength or the like, by tracking the severity of the deformations of the elastomeric body 102.

CONCLUSION

The foregoing description has broad application. For example, while examples disclosed herein may focus on utilizing a support structure to support the elastomeric input device, it should be appreciated that the concepts disclosed herein equally apply to other positioning locations for the elastomeric input device, e.g., incorporated into a mobile electronic device, dashboard of a vehicle, etc. Furthermore, while examples disclosed herein may focus three-dimensional modeling, the concepts disclosed herein may equally apply to other applications, such as providing a two-dimensional input device or using the three-dimensional input data to control a non-three-dimensional object. Also, while the examples disclosed herein may tend to focus on the optical sensors or devices, such as cameras, these concepts apply to other position and deformation sensors. Accordingly, the discussion of any embodiment is meant only to be exemplary and is not intended to suggest that the scope of the disclosure, including the claims, is limited to these examples.

As described herein, operably may mean any suitable system that allows communication of signals between the components, directly or through other intervening components or systems, including wireless, wired, optical, or the like.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. An input device configured to be in electronic communication with a computing device, comprising:
   an elastomeric material forming at least a portion of an object; and
   a tracking structure positioned in the object, the tracking structure comprising
      interrelated elements detectable by a tracking device, the interrelated elements defining substantially conical, pyramid, or frustum shaped three-dimensional structures; and
      one or more resolution enhancers defined along a sidewall of each three-dimensional structure; wherein
   upon deformation of at least a portion of the object, the tracking structure deforms correspondingly and the tracking device detects the deformation of the tracking structure.

2. The input device of claim 1, wherein the tracking device is in electronic communication with a computing device, and the tracking device communicates signals to the computing device representative of the deformation.

3. The input device of claim 1, wherein the tracking device is a sensor.

4. The input device of claim 1, wherein the tracking device is a camera.

5. The input device of claim 1, wherein the object defines a length, a width, and a height dimension and the tracking structure varies in diameter along the height dimension of the object.

6. The input device of claim 5, wherein the three-dimensional structures are disposed in at least one common surface inside the object.

7. The input device of claim 6, wherein the common surface is a common plane within the object.

8. The input device of claim 5, wherein the three-dimensional structures have a unique characteristic detectable by the tracking device.

9. The input device of claim 8, wherein the unique characteristic is a fluorescent property.

10. The input device of claim 5, wherein the common surface of intersecting members is angled with respect to a reference plane of the body.

11. The input device of claim 5, wherein the common surface of intersecting members is curved with respect to a reference plane of the object.

12. The input device of claim 1, wherein the tracking structure includes at least one form defining the three-dimensional structures, the at least one form positioned in the elastomeric material.

13. The input device of claim 12, wherein the at least one form is a three-dimensional form.

14. The input device of claim 12, wherein the at least one form is a three-dimensional shape.

15. The input device of claim 14, wherein a bottom perimeter of the at least one three dimensional shape is aligned with a bottom surface of the elastomeric material and the at least one three dimensional shape extends upwards towards a top surface of the elastomeric material.

16. The input device of claim 13, wherein the at least one three dimensional form is a recess defined in the elastomeric material.

17. The input device of claim 13, wherein in the at least one three dimensional form is formed of a material positioned within the elastomeric material.

18. An input system for a computing device, comprising:
   an elastomeric input device, including
      an elastomeric material; and
      a tracking structure operably associated with the elastomeric material comprising
         interrelated elements having a conical, pyramid, or frustum shape; and
         one or more resolution enhancers defined along a sidewall of each interrelated element, wherein when the elastomeric material is deformed the tracking structure deforms; and
   a tracking device configured to sense the interrelated elements and the one or more resolution enhancers of the tracking structure and produce deformation data corresponding to a deformation of the tracking structure.

19. The input system of claim 18, further comprising a support structure configured to support the elastomeric input device at a position relative to the tracking device in a manner to allow the tracking device to sense the deformation of the tracking structure.

20. The input system of claim 19, further comprising a computing device electronically connected to the tracking device and configured to receive the deformation data from the tracking device.

21. The input system of claim 19, wherein the one or more resolution enhancers have fluorescent properties.

22. The input system of claim 21, further comprising:
   a light source configured to illuminate the tracking structure and activate the fluorescent properties of the resolution enhancers; and
   the tracking device configured to sense the deformation of the tracking structure by monitoring the motion of the fluorescent properties.

23. The input system of claim 19, wherein the tracking structure includes at least one form positioned in the elastomeric material.

24. The input system of claim 18, further comprising a computer in communication with the tracking device and configured to display an object on a display device deforming in a predetermined correlated manner to the deformation of the tracking structure.

25. A method for tracking three-dimensional movements comprising the steps of:
   deforming an elastomeric input device, the elastomeric input device including an elastomeric material; and
a tracking structure comprising
  a plurality of frustum, pyramid, or conical shaped cavities defined within the elastomeric material; and
  one or more alignment lines defined along a sidewall of each of the cavities, wherein the cavities are configured to deform in a corresponding manner with the elastomeric material; and
sensing a deformation of the tracking structure by sensing deformation of the cavities and the one or more alignment lines as the elastomeric material is deformed.

26. The method of claim 25, further comprising determining at least one parameter corresponding to the deformation of the tracking structure.

27. The method of claim 26, further comprising determining a deformation of the elastomeric input device using the at least one parameter.

28. The method of claim 25, further comprising applying the deformation of the tracking structure to an application.

29. The method of claim 25, further comprising transmitting the deformation of the tracking structure to a computing device.

30. The method of claim 29, further comprising displaying an object on a display device deforming in a predetermined correlated manner to the deformation of the tracking structure.

31. The input device of claim 1, wherein the one or more resolution enhancers are further defined at a first end of each three-dimensional structure.

32. The input device of claim 1, wherein the three-dimensional structures are cavities formed within the elastomeric material.

* * * * *